GENERAL PURPOSE PARALLEL SEQUENCING COMPUTER

Filed Oct. 14, 1959 12 Sheets-Sheet 1

INVENTOR.
Hugh L. Millis Jr.

Aug. 31, 1965 H. L. MILLIS, JR 3,204,087

GENERAL PURPOSE PARALLEL SEQUENCING COMPUTER

Filed Oct. 14, 1959 12 Sheets-Sheet 2

INVENTOR.

Hugh L. Millis Jr.

INVENTOR.

INVENTOR.
[signature]

INVENTOR.
Hugh L. Millis Jr.

INVENTOR.
Hugh L. Millis, Jr.

FIG. 12A
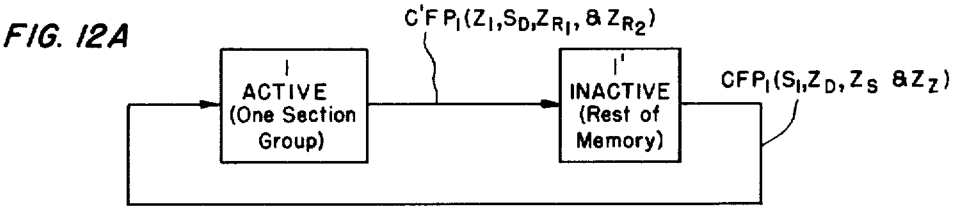
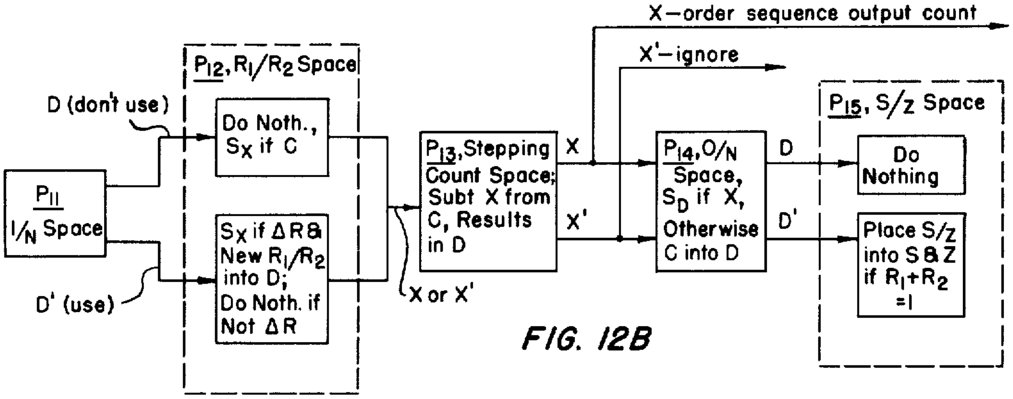
FIG. 12B
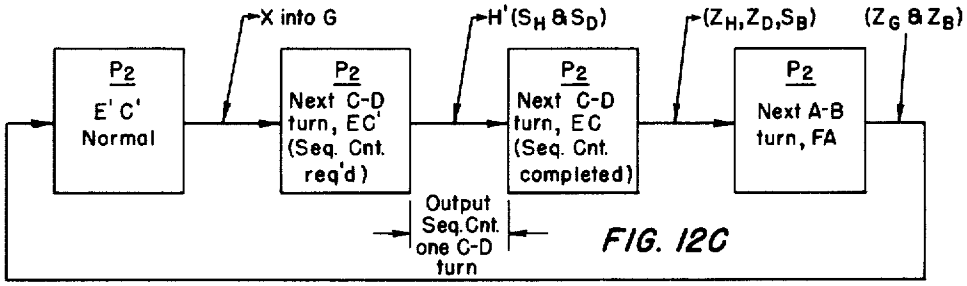
FIG. 12C
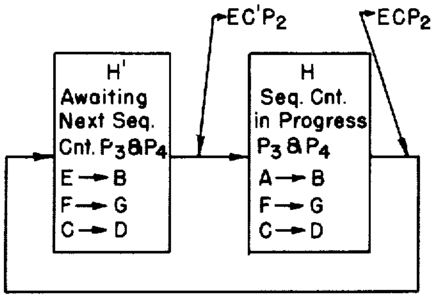
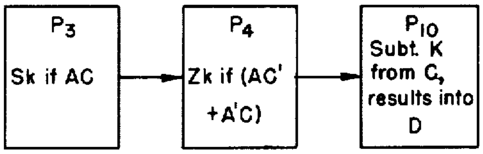
FIG. 12E
FIG. 12D
INVENTOR.
[signature]

INVENTOR.
Hugh L. Millis

INVENTOR.

Hugh L. Millis, Jr.

INVENTOR.
[signature]

INVENTOR.

INVENTOR.

Hugh L. Millis, Jr.

3,204,087

GENERAL PURPOSE PARALLEL SEQUENCING COMPUTER

Hugh L. Millis, Jr., 1056 Newkirk Drive, La Jolla, Calif.

Filed Oct. 14, 1959, Ser. No. 846,280
18 Claims. (Cl. 235—151)

The present invention relates to a general purpose parallel sequencing computer and, more particularly, to a magnetic memory drum computer capable of ordering the actuation of a plurality of actuators disposed in parallel to the computer, in accordance with any predetermined sequencing pattern.

In the general expansion of automation, an increasing number of digital computers are being applied to the solution of continuous flow processes, such as oil refineries and other related, essentially chemical plants. In these applications, such quantities as temperatures, pressures, flow rates, chemical properties, are sampled, computationally related to each other and are then individually controlled to maintain certain specified relationships. The basic process involved is one of effectively continuously controlling a series of interrelated, continuous quantities.

Another and basically quite different area in automation, but one having considerably wider application, may be defined as sequence processing or sequencing control in which individual, discrete actions of interrelated mechanisms are required on a relative time ordered or time arranged basis to provide a unified, final operational result. An example of a sequenced process might include the control of the so termed auxiliary functions of an individual automatic machine tool, including such factors as power, lubricant, lubricant temperature, drill speed, work piece loading and unloading, drill change, etc. Extensions of this sequencing process may include the sequenced control of a plurality of machine tools, arranged, for example, in a transfer line in which not only a number of functions of each tool must be individually controlled as a sequenced process but the operations of all machine tools interrelated with each other by a higher level sequenced process.

Two basic approaches or principles have been followed to date in mechanizing the sequencing process requirements. In one approach, a series of related components are sequentially operated relative to each other by means of various cams, clutches, intermittent motion devices, links, ratchets, gearing, etc., arrangements, the entire mechanism being powered by one prime mover. Bottling and canning factories, automatic phonograph record change mechanisms, etc., to name a few, have long employed such techniques which, in general, were derived from the field of, so termed, ingenious mechanisms. The principles and techniques of ingenious mechanisms, it may be noted, had been substantially established by the turn of the century and generally only applications of its basic techniques in various areas have since been made. The application of ingenious mechanism techniques to sequencing problems represents an analogue approach to the problem.

Sequencing, as a basic process, however, is essentially digital in nature, since any element engaged in sequential relationship with other like elements, can generally be abstracted to always take a steady state condition, for example, "on," "off," "in," "out," "up," "down," etc. It is this digital form of sequencing which has evolved more recently as the second basic approach to the mechanization of sequencing problems, owing primarily to the inflexibility and the inherent limitations as to the types and number of elements which can be simultaneously handled by the analogue or ingenious mechanism type of sequencing.

The sequencing operation comes about in ordering changes in the steady state conditions of the various component elements on a relative time programmed basis, generally related to the completions of changes of states of other elements. Such changes of state are involved with on-off functions, such as power, and also with movement, such as a ram-in to a ram-out condition, with such movements, in general, being non-servoed, that is, there is no particular, specific velocity control requirement. Only that the initiated operation has been completed, that is, its ordered state has beeen achieved, is of importance and is used in programming the actuation of the next following element or series of elements in the sequencing cycle. Also, in general, the sequenced cycle pattern of a complex mechanism will involve both series and parallel requirements, that is, some elements may be simultaneously activated at a predetermined point in the cycle, while others must be individually activated one after the other in series fashion.

Sequencing, as a distinct, specific digital process has not been generalized in the way that recent computer advances made in the continuous process field appear to have generalized that area of automation. However, a number of non-generalized digital techniques, using mechanical, electro-mechanical and, more recently, electronic techniques have been employed to date for meeting the wide variety of sequencing requirements. Owing to the large number of different types of non-generalized sequencing techniques presently employed, it is impossible to discuss their individual natures in detail, although a few major digital sequencing schemes may be noted.

For example, a number of mechanical and electro-mechanical sequencing schemes employ real time as a basis for programming various actuators associated with a sequencing cycle. A mechanical drum, for example, may be driven at a constant speed and various pins, inserted around its surface, contact various switches which are coupled, in turn, to the actuators and thereby order various actuations. Here, no feedback is generally taken to indicate that an actuation cycle has been completed since the actuators are designed to and, hence, are assumed to complete their operations within a specified time limit, based upon the drum rotation speed. This open-ended type of control, of course, can lead to disastrous consequences in that actuator malfunctions cannot be recognized by the programming mechanism and the sequence halted. Also, such a technique, although having some flexibility in that the sequenced order may be changed by moving the drum pins, is still physically limited by the number of holes which can be placed on the drum. Also, the paralleled, completely independent operation at one time, of more than one specific machine, such as a machine tool, lies outside the scope of such techniques. On the other hand, rotating such a programming drum based upon completion of each pin ordered actuation, in order to eliminate problems associated with the lack of feedback, leads to serious external complexity and even greater inflexibility in its programming capabilities.

The most recent advance in sequencing, particularly in its application to the automation field, has been in the use of, as termed, sequential switching analysis in which logical elements, such as flip-flops, "and" and "or" circuits, limit switches, etc., generally mechanized in magnetic device form, are combined to provide sequencing cycles of actuation of, for example, a transfer station. In its more sophisticated applications, the conduction state combinations of a series of bi-stable flip-flops and limit switches are applied through gating circuits to order driving power applied to the various actuators. The combination of memory flip-flops, limit switches, etc., output states at any time determine whether a given actuator is powered or not. Each completion of an actuator ordered cycle will result in its output state being changed with a subsequent change in the flip-flop and limit switch state combination and the resulting operation of other actuators, etc., in accordance with the logical connections.

Here, the difficulty is one of inflexibility in that changes of sequence require reconnecting or rewiring of the logic. Also, this technique becomes increasingly more complicated whenever a number of different levels or subcycles, each controlled by individual logic loops, need to be sequenced relative to each other, and this also emphasizes the inflexibility of the basic technique since, again, any minor modifications in the sequencing arrangement require extensive overall changes in the logic connections.

Recently, electronic sequencing techniques have been extended to cover such areas as the checkout of missile and missile launch stations which, in turn, are basically sequenced systems. The input devices in such checkout systems are, in most cases, punch cards or tapes and, hence, permit a degree of flexibility in the input programming. However, such techniques are essentially serial in nature, taking card or tape information in series, and making corresponding tests, etc. Such techniques do not have direct application to the general automation class of problems, owing to the combined series and parallel nature of automation sequencing requirements. That is, this type of serial checkout sequencing technique would have to be applied to each serial type of problem arising in automation with some other technique being employed to provide the necessary parallel sequencing relationships between the serial portions.

The system of the present invention proposes to provide a generalized sequencing technique which possesses complete coding flexibility, is able to sequence a large number of actuators in a completely parallel relationship to each other, or in any mixture of series and parallel relationships, and is capable of providing additional sequencing and control capabilities not present in existing techniques. In particular, the present system employs a rotating magnetic memory drum, a series of output actuators to be controlled by the system, and a mechanical commutator driven by the drum which effectively interconnects the computer and the actuators. In brief, the memory drum includes a working, a transfer, and a short recirculating channel, all divided or programmed by several associated permanent channels, into a series of equally lengthed sections. The short channel is equal to one section length while the working and transfer channels extend completely around the drum except for a gap, also equal to one section length. For the purposes of the immediate discussion, it can be assumed that the series of sections correspond to the respective series of actuators, with each actuator being accordingly controlled by a separate section. Finally, a very long permanent channel, recorded in the form of a spiral track on the memory drum surface, is scanned by a moving head, and is employed to hold additional programming information as required for complex sequencing problems.

Each section contains two major portions, as programmed by the permanent channels. One portion, termed actuator control portion, serves to program the actuation of its associated actuator, that is, determines the direction and, for some types of actuators, the magnitude of actuation. Another portion, termed sequence count portion, essentially determines when its associated actuator control portion is to order the actuation of their associated actuator. Thus, the actuator control portion determines what kind or type of actuation is to be ordered, and the sequence count portion determines when the actuation is to take place. The "when," as determined by the sequence count portion, is essentially determined by completions of other ordered actuation cycles by other sections and this characteristic, in turn, provides the sequencing capabilities of the computer. The working channel holds the present, or operating, information of all sections while the transfer channel carries advance information relating to the next actuator control cycle for each section.

The commutator includes a movable arm, driven by the memory drum at a predetermined fraction of its speed. The arm contains a plurality of brushes which are arranged to make successive engagement upon movement of the arm with a corresponding plurality of commutator contacts. The commutator contacts, in turn, are connected to the input and output terminals of the series of actuators in a staggered manner such that the output terminals of one actuator are contacted concurrently with the input terminals of the next following actuator in the series. The commutator brushes undergo, during this arm movement, alternate contact and non-contact cycles with the series of contacts. This results, owing to the staggered placement, in the input and output terminals of each actuator being consecutively contacted during adjacent contact cycles. These alternate commutation contact and non-contact cycles are directly associated with a corresponding pair of respective alternate inactive and active cycles of computer operation.

In particular, considering a single actuator, for example, during the first contact cycle, the then existing state of the actuator is packed up by the computer from the output terminals of the actuator through the commutator. Then, during the following non-contact cycle, during which the computer switches to its active mode, the actuator state value is examined and a determination made as to whether the actuator state is to be ordered changed. Then, during the next following contact cycle of the commutator and inactive mode of the computer, triggering signals, if required, are applied to the input terminals of the actuator through the commutator. Owing to the staggered brush arrangement, the existing state of the next following actuator in the series is sensed or picked up by the computer simultaneously with the application of this computer output signal to the referred-to actuator. Accordingly, during each commutator contact cycle, the input state of the next actuator is picked up while triggering signals, if any, are applied to the preceding actuator.

The rotational speed of the commutator arm is so related to the memory recirculation time that adjacent contact and non-contact intervals correspond to one working channel recirculation interval. Also, the series of sections, as will be made more clear later, are, in a preferred embodiment, arranged into groups, each group serving a single actuator, with the number of section groups equalling the number of actuators. Accordingly, continuous rotation of the drum and commutator enable each section group to be in signal communication with its actuator during successive commutator brush rotations.

The sequencing portions of all sections in the computer are generally in continuous interrelated operation, independent of the operations of actuator control portions and commutator. In particular, whenever the actuation of an actuator has been completed, as ordered by the control portion of its associated section, this information must be communicated to the other sections coded to receive it, in order that they might, in turn, program their own actuators if so required in the general sequencing scheme. This is accomplished by having an input and output code associated with each section. After each completion of an ordered actuation, that section's output code is placed in the short channel for one full turn of the working channel and compared with the input code of each of the computer sections. If matching occurs during this comparison process, meaning that a section is coded to receive the output of the particular section whose actuator change has been completed, a count is subtracted from a sequence count number, also contained within each section's allotted memory space.

The initial magnitude of the sequence number in each section corresponds to the number of matchings which are to occur between its input code and other output codes prior to the time its associated actuator is to be ordered into a predetermined actuation cycle. This, in turn, corresponds to the number of completions of changes of state of certain, selected other actuators. When the specified number of these actuations has been completed, the sequence number will overflow, which denotes that the section is to then begin an actuation cycle of its associated actuator. This is performed in the computer by immediately ordering the information in the transfer channel, corresponding to that section, transferred into the working channel. This transfer operation will bring up new actuator control information, which, in turn, will immediately begin the ordered operation of its actuator for that cycle. Upon completion of this actuation cycle, the previously noted output code count is made and the actuator control portion goes into an inactive status during which time its corresponding actuator state is no longer ordered changed. Thus, each completion of an actuator cycle is communicated to all other sections and each section will begin a new cycle of operation based upon a predetermined number of completions of other actuator cycles.

A section fill operation is incorporated in the present computer system in order that additional section sequencing information can be brought from the spiral channel to the transfer channel as required after each section's transfer operation. This is primarily accomplished by including an address with each section which refers to the location in the spiral channel of the next set of operating information for that section. Accordingly, whenever a transfer has been made from the transfer to the working channel, the address contained in that section is placed in the short channel, which then searches for a corresponding address in the spiral channel, representing, in turn, the location of the next set of section information. This information, including the next following address, will then be transferred from the spiral channel into the short channel, from which it is transferred again to its proper place in the transfer channel.

Finally, another basic machine operation, termed channel fill, is provided which causes the information in entire spiral tracks directly transferred into the working and transfer channels. This operation enables the computer to handle independent sets or types of sequencing problems without external reprogramming since input and output code relationships may be changed between the sections.

This channel fill operation is performed by a channel fill commutator, and a pair of actuators controlled by a respective pair of the computer sections. The channel fill commutator includes a series of contacts which are serially contacted by a brush arm driven at a predetermined speed of the memory drum. The brush is both energized and initially aligned with the spiral channel head such that it serially energizes the commutator contacts at the beginning of alternate spiral channel loops or tracks, each track, in turn, corresponding to the length of the working channel length. In this way, the serially appearing signals on the contacts are related timewise to spiral channel information as it appears in the spiral channel "read" flip-flop.

One of the computer controlled actuators incremently drives the moving arm of a multi-contact or stepping switch whose series of fixed contacts, in turn, are connected to the series of commutator segments, respectively. The computer drives this actuator's moving arm in accordance with its programmed information until it rests upon the stepping switch contact point corresponding to the particular spiral channel track fill information to be entered into the working and transfer channels.

The other actuator controlled by the computer comprises a flip-flop whose output terminals are coupled directly into the computer logic. After the preceding actuator has been positioned at its desired switch point, this flip-flop will be ordered "set" by the computer, which will occur only when a machine "idle" condition exists, that is, no section fill operation is under way or sequence count is being performed. When this flip-flop is finally "set," further section fill or sequence count operations are inhibited and, upon the appearance of the channel fill commutator signal on the movable arm of the multi-position switch actuator, a programmed operation is initiated which transfers information from selected sections on the spiral channel into, first, the working channel for a first drum turn and, then, into the transfer channel for a second drum turn. When this transfer is completed the actuator controlled flip-flop is returned to its normal state by the computer logic and the computer resumes its normal operation based upon the new channel fill information.

Copious use is made of time-sharing, memory programming, and other techniques in the detailed design of the present system to achieve an overall system having a relatively small number of electronic circuit components. For example, 8 memory "read" flip-flops, 3 memory "write" flip-flops, 8 logical flip-flops, and 4 input-output flip-flops represent the total system flip-flop requirements. This figure compares favorably with a majority of digital computers where flip-flops are generally numbered in terms of hundreds, and, in some cases, thousands. Also, in a preferred embodiment, 60 actuators may be handled in complete parallel relationship by the computer.

Three different types of actuators are described, representing generalized versions of the types of actuators capable of being controlled by the present computer system. Input, output and logic requirements for all actuator types are arranged to be exactly similar so that any computer section can control any actuator type. Each actuator has two input connections and two output connections, all, in turn, being connected to appropriate contacts on the actuator commutator for communication with the computer. One actuator type is a simple on-off switch, as for example, a flip-flop or relay whose general use in sequencing will be for turning power, motors, etc., or other actuators which have two primary states, on and off. Another type of actuator, representing a large class of actuators found in sequencing and automation problems, is referred to as a two-position variety. In this actuator type, a motor, for example, is energized to drive a load in one direction until a limit switch is contacted, at which time the motor is deenergized. Energization in the opposite direction produces an opposite direction of motor travel until another limit switch is contacted, which again turns the motor off at its opposite position. Examples of two-position actuators include drill up-drill down, ram in-ram out, valve open-valve closed, etc.

The final generalized type of actuator is termed multi-position or stepping and will, in the general case, possess bi-directional stepping capabilities. The general utility of the present system is greatly extended by its capabilities of driving multi-position stepping types of actuators from its basic, binary type of logic. Stepping actuators can be employed for actuating multi-level switches and thereby switch power sources, amplifiers, gain controls, etc., between a number of motors, solenoids, and other actuators on a time-shared basis. On the other hand, stepping actuators may be employed to drive loads, such as multi-position valves, multi-position stops or limit switches, employed, in turn, for determining the extent of travel of the two-position type of actuator, etc., rotating potentiometers in incremental fashion for controlling gain, voltage characteristics, etc.

A suggested electronic relationship is set forth for incorporation in the commutator and actuators which effectively immunizes the computer system against possible commutation contact errors, such as non-contact cycles, due to brush bounce, high impedence commutation cycles, etc., or the transmittal of spurious voltages, etc. Hence, the system is essentially logically secured from a large number of possible types of commutation errors.

A number of different types of control relationships may be coded into the computer between the actuator control portion of a section and its associated actuator. These coding possibilities are set forth in detail later, and brief indications are given to what typical problems arising in sequencing problems each might be useful in meeting. A machine tool change mechanism is set out, by way of example, and a coding technique is shown for controlling the sequenced relationships between its respective actuators. In addition, a generalized scheme is shown for indicating how an infinite number of serially required actuations may be performed in any random serial sequence on an infinite number of actuators only employing two computer sections. Another example is given which indicates how a single amplifier and associated power and logic connections may be time-shared between a plurality of motors or other actuators where their sequencing on a serial or mutually exclusive basis only is permissible, as contrasted to parallel requirements. Only two computer sections are required for this function. An example is also cited where a combination of both parallel and series sequencing requirements may be simultaneously met by the computer system.

A final use of the present system is given for achieving fail-safe operation. In this embodiment, three independent similar computer systems are related through a voting circuit such that any time that any one of the three computer output values, as ordered into its "write" flip-flops, or actuator commutator, should differ from the other two, the differing output value is automatically corrected and a proper value used. Any erroneous values thus ordered by the three computers are transferred into respective, separate actuators controlled by the computer combination and recorded therein. Whenever a predetermined number of errors has been made, the computer is automatically closed down for repairs and an output indication of the operation halt given. The practicability of actually employing three computers for achieving error-free operation is predicated on the previously noted small size of the computer.

It is, accordingly, the principal object of the present invention to provide a general purpose sequencing computer capable of ordering any predetermined sequenced pattern of actuations of a plurality of actuators.

Another object of the present invention is to provide a digital computer capable of ordering the individual actuations according to a predetermined pattern, of a number of actuators disposed in parallel to itself.

Another object of the present invention is to provide a digital computer which orders, according to a programmed basis, the changes of state of a series of actuators according to the completion of changes of state of other actuators in order to perform sequencing process control.

Another object of the present invention is to provide a computer for ordering the actuation of a series of actuators according to any predetermined sequenced relationship where the computer includes a series of individual parts corresponding to the respective series of actuators and each of the parts orders the actuation of its associated actuator based upon completions of actuations by predetermined actuators of the series of actuators as signaled to it by the series of parts.

A further object of the present invention is to provide a computer for ordering the actuation of a series of actuators according to any predetermined sequenced relationship where the computer includes a series of sections corresponding to the respective series of actuators and each of the sections includes an actuator control portion and a sequence counting portion, the actuator control portion of each section ordering upon demand the actuation of its associated actuator and applying output signal indications upon each completion of actuation of its associated actuator to the sequence counting portions of predetermined sections, each of the sequence counting portions responding to a predetermined number of applied input signal indications for ordering the next cycle of actuation by its associated actuator control portion.

A still further object of the present invention is to provide a general purpose parallel sequencing computer serially communicating through a commutator arrangement with a series of external actuators, each of the actuators normally being at least one of two steady state conditions and responsive when activated for changing its steady state condition, the digital computer including a series of sections corresponding to the series of actuators, respecitvely, each of the sections including an actuator control portion responsive when actuated for ordering the actuation of its associated actuator and producing an output signal indication when the ordered actuation has been completed and further including a sequence counting portion which is responsive to a predetermined number of input signal indications for actuating its associated actuator control portion, the computer acquiring parallel sequencing capabilities by routing the output signal indication produced by the actuator control portion of each of said sections to preselected sequence counting portions of the series of sections.

Another object of the present invention is to provide a general purpose parallel sequencing computer capable of ordering the actuations of a series of actuators in a completely parallel fashion where any actuator may be an off-on type, a two-steady state or position type, or a multi-position stepping type.

Still another object of the present invention is to provide a general purpose parallel sequencing computer capable of controlling a series of external actuators according to a plurality of pre-arranged sequenced patterns and is further capable of being programmed to modify the plurality of pre-arranged sequenced patterns.

A further object of the present invention is to provide a general purpose parallel sequencing computer capable of controlling a series of external actuators which include a pair of actuators serving, when actuated by the computer to order fill information automatically placed in the computer which modifies the sequencing relationships between the series of actuators.

A still further object of the present invention is to provide three general purpose parallel sequencing computers, each of which are capable of ordering the actuations of a series of external actuators according to any predetermined pattern, where the three computers control one series of external actuators according to one predetermined pattern through a voting network with one of the external actuators being actuated by the computers to turn the three computers off if a predetermined number of mistakes are made by any of the computers.

Another object of the present invention is to provide a general purpose parallel sequencing computer capable of controlling each of a series of external actuators based upon, as coded, completions of ordered actuations of the series of actuators, upon real time as sensed by the computer, upon the occurrence of external events, and upon combinations of all three.

Other objects, feautures and attendant advantages of the present invention will become more apparent to those skilled in the art as the following disclosure is set forth including a detailed description of a preferred embodiment of the invention as illustrated in the accompanying sheets of drawings, in which.

Figure 11A:
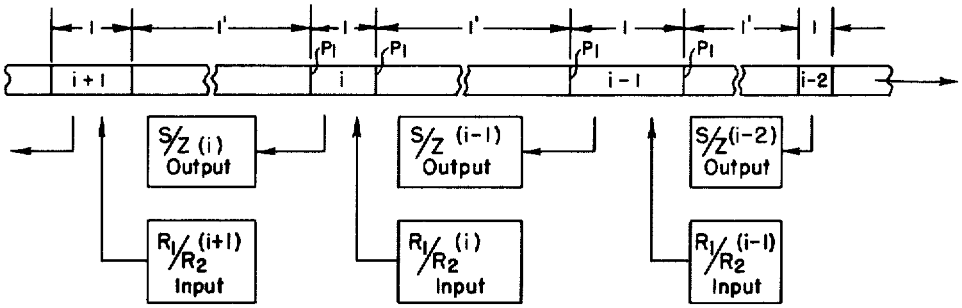
Figure 11B:
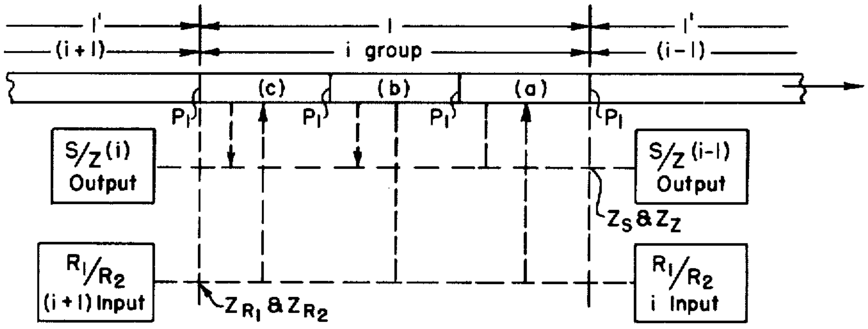
Figure 14:
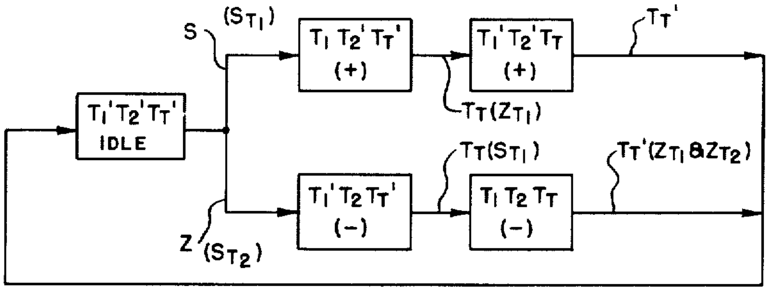
Figure 13A:
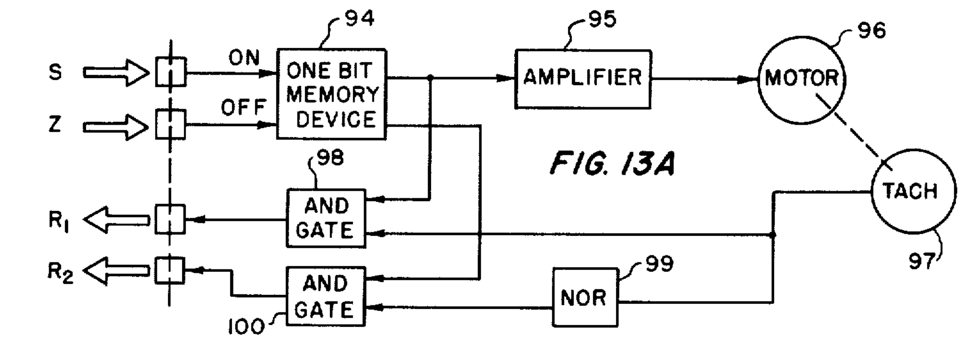
Figure 13B:
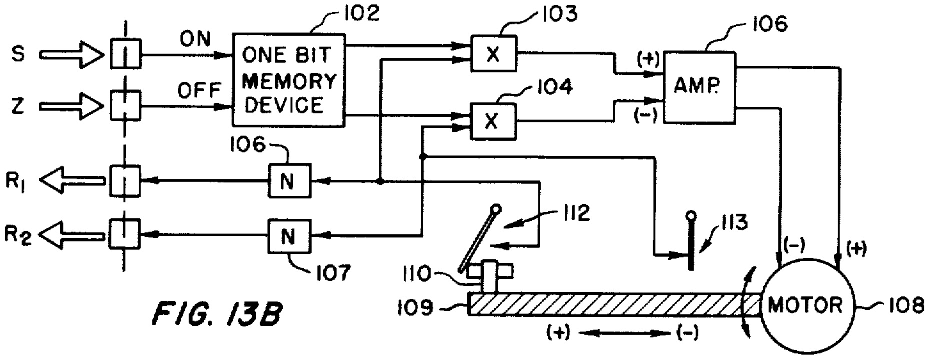
Figure 13C:
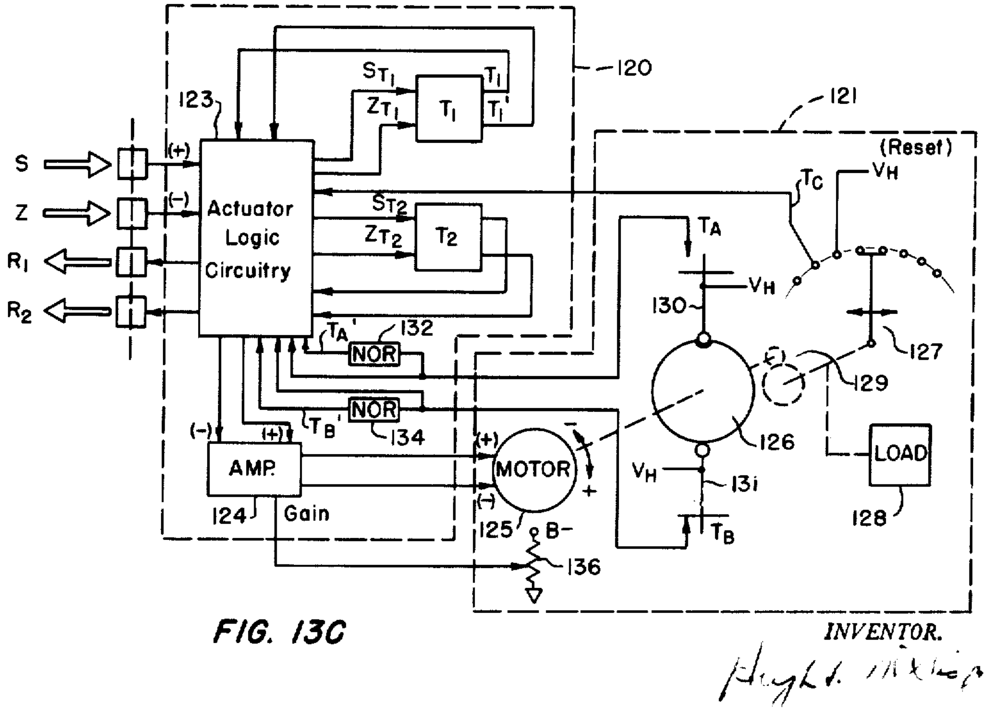
Figure 15A:
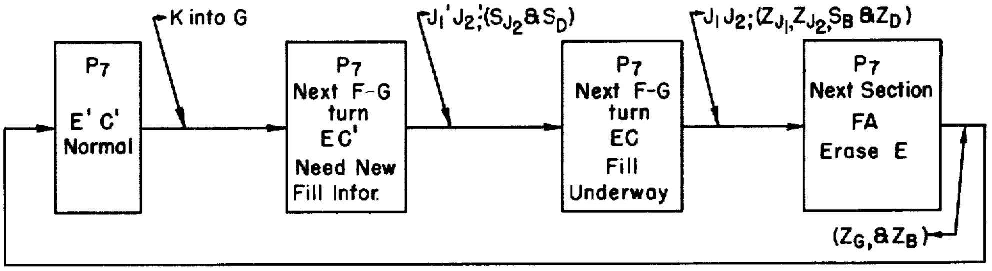
Figure 15B:
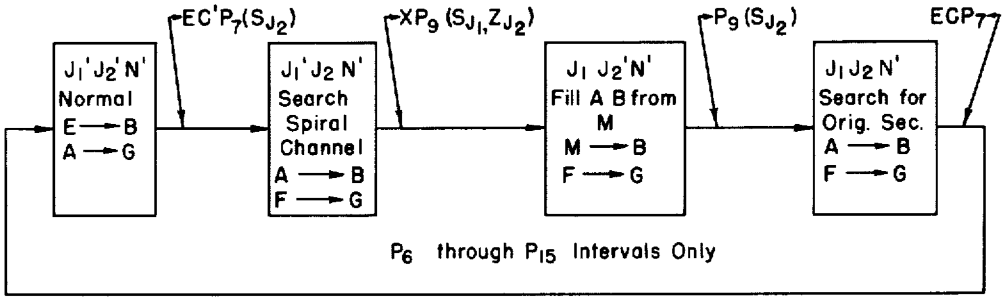
Figure 15C:
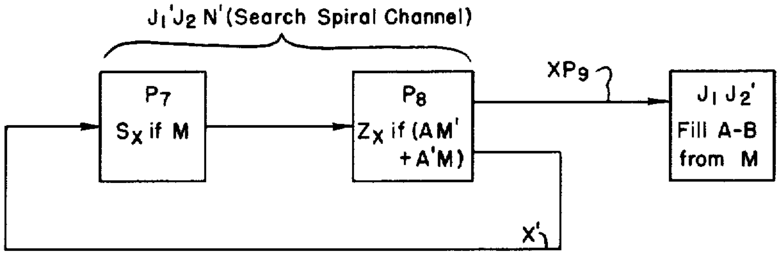
Figure 16:
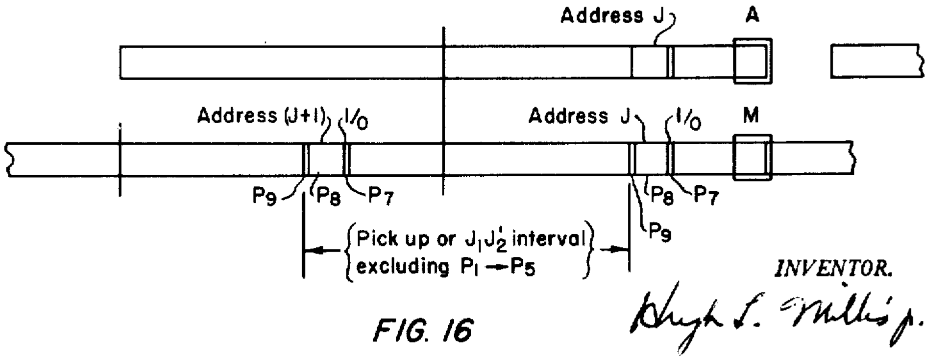
Figure 17:
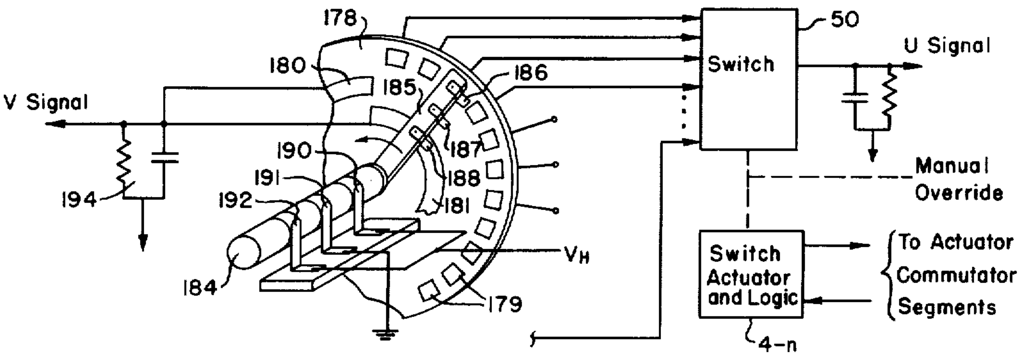
Figure 18:
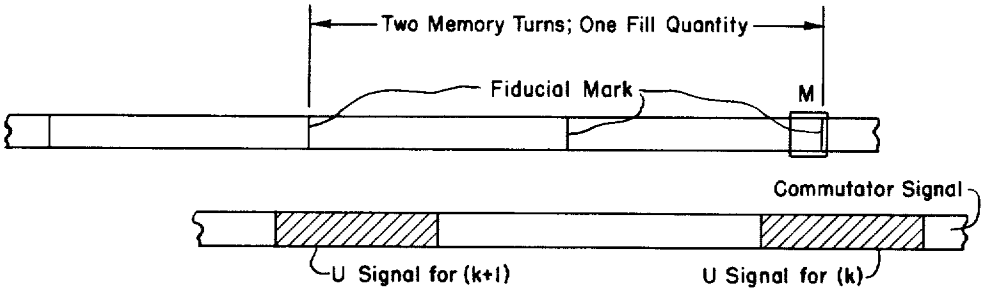
Figure 19:
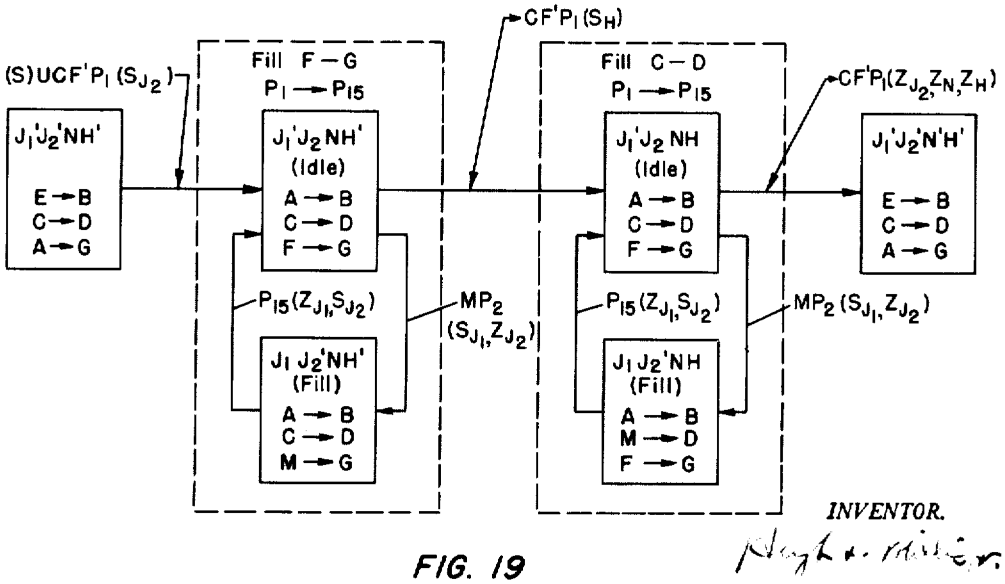
Figure 20:
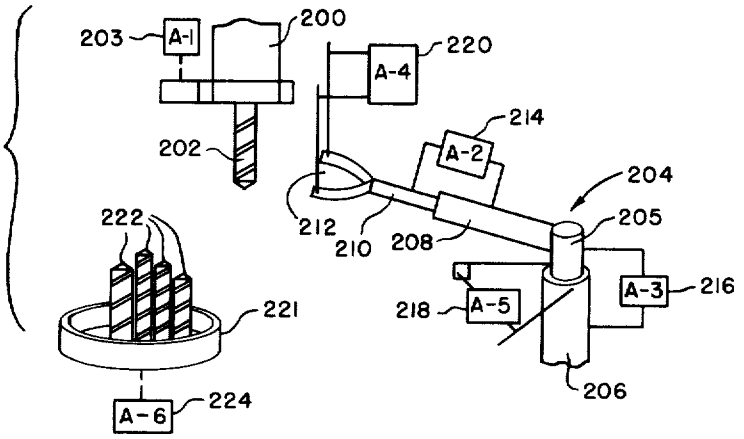
Figure 21:
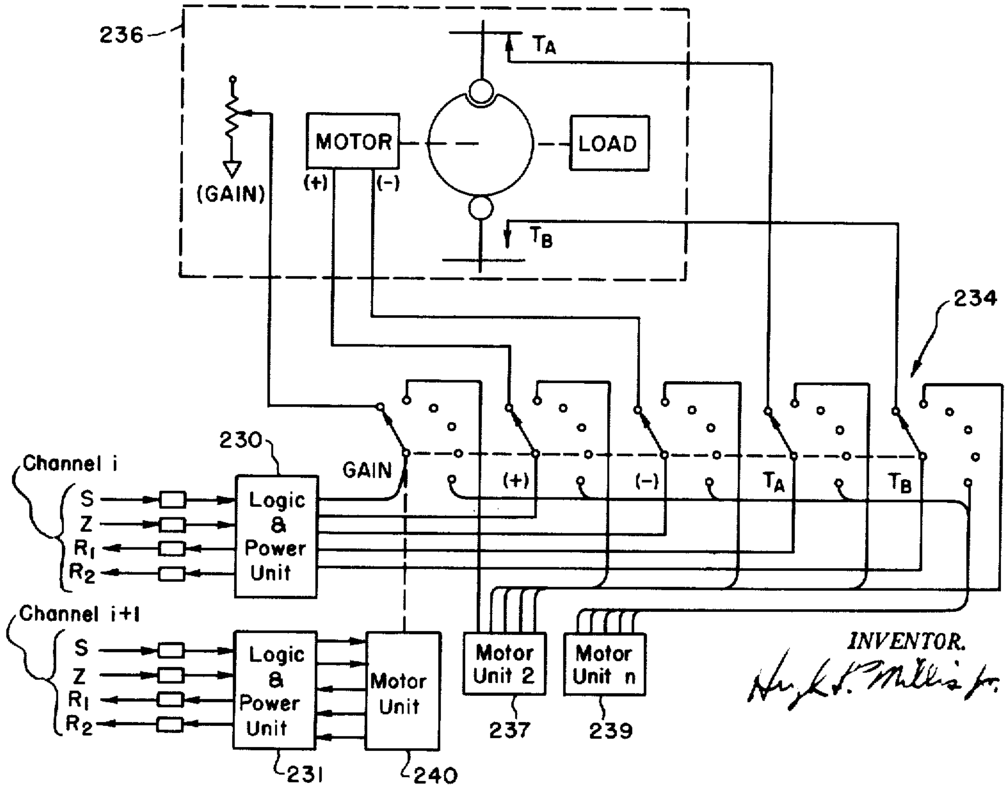
Figure 22:
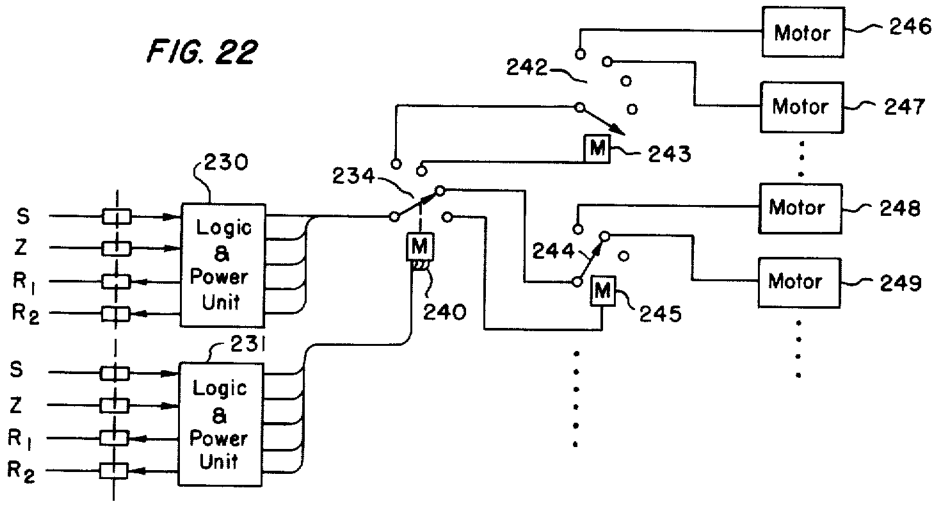
Figure 23:
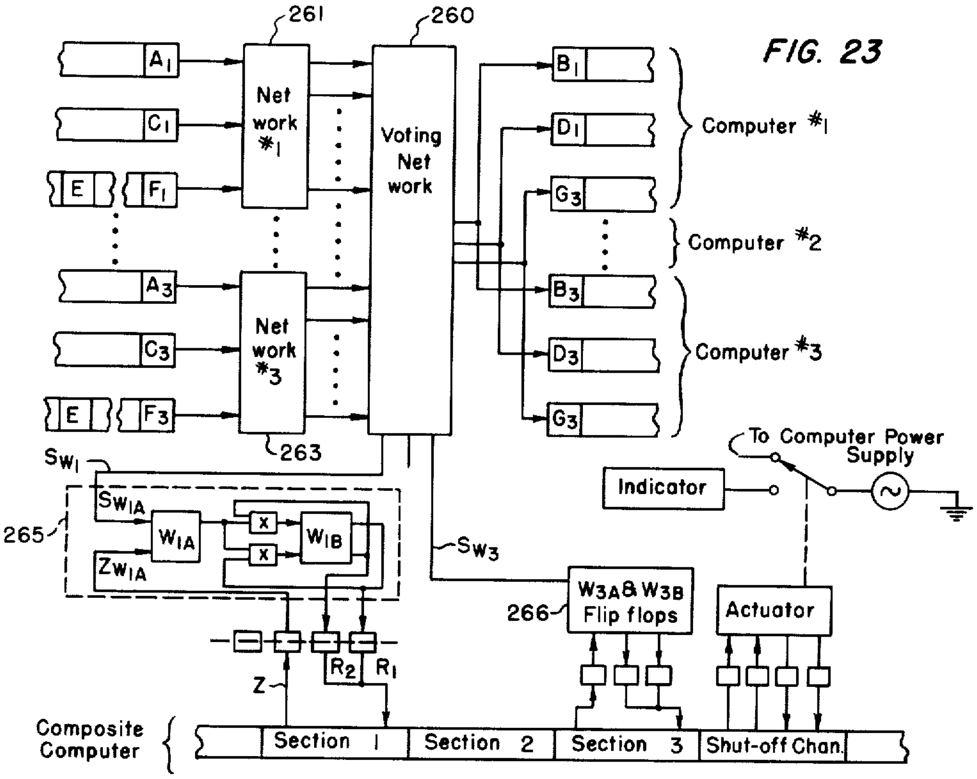

FIGURES 11*a* and 11*b* illustrate the actuator commutator and recirculating memory relationships;

FIGURES 12*a* through 12*e* show the logical programming involved in several of the computer subcycle operations;

FIGURES 13*a* through 13*c* are part electrical diagrammatic and mechanical schematic views of three typical types of actuators capable of being controlled by the present computer system;

FIGURE 14 is a programming diagram of the actuator shown in FIGURE 13*c* for illustrating its operation;

FIGURES 15*a* through 15*c* illustrate logical programming diagrams of additional computer subcycle operations;

FIGURE 16 illustrates the short channel and spiral channel relationship as required for the section fill computer operation;

FIGURE 17 is a partly broken away mechanical perspective and electrical block diagrammatic view of the track selector commutator and associated computer elements;

FIGURE 18 illustrates the signal relationships between the spiral channel and the track selector commutator;

FIGURE 19 is a logic programming diagram of the channel fill operation;

FIGURE 20 is a mechanical and electronic schematic representation of a machine tool change mechanism capable of being operated by the computer system;

FIGURE 21 illustrates a pair of actuators controlled by the computer system which are capable of driving a plurality of motor units;

FIGURE 22 illustrates a technique of employing two computer channels to serially sequence a much larger number of actuator sections; and FIGURE 23 illustrates one manner in which the present computer may register its own errors and close itself down wherever a predetermined number of errors have been made.

A. COMPUTATIONAL PRINCIPLES OF OPERATION

Figure 1:
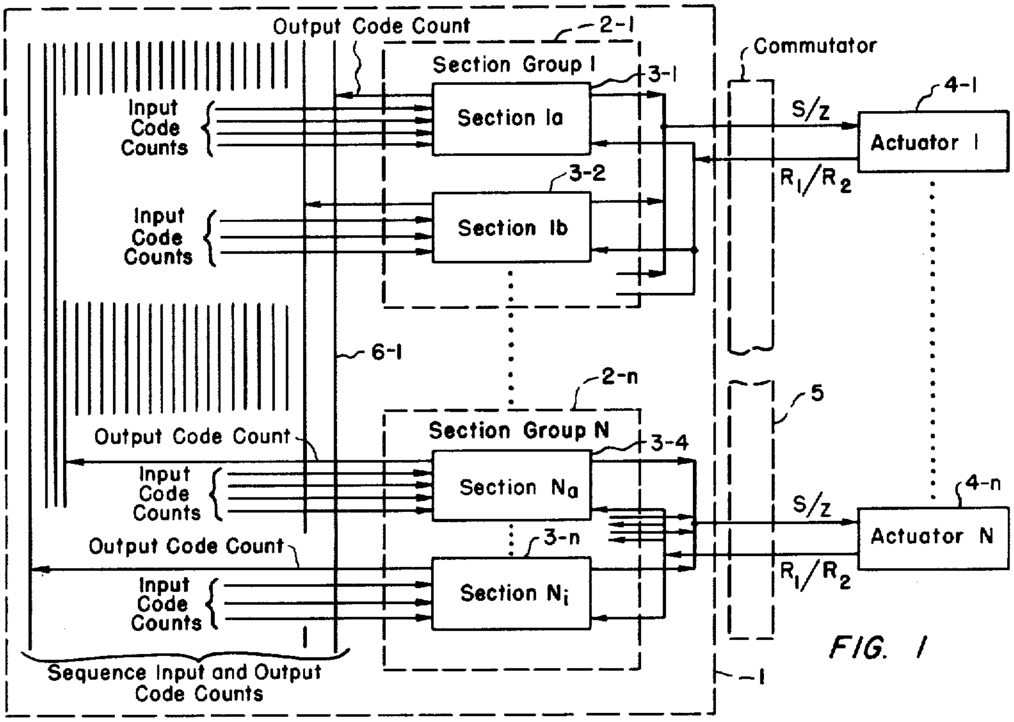
FIGURE 1 is a symbolic representation for illustrating one of the principles involved in the operation of the present computer system.

Referring now to the drawings wherein the same elements are given identical numerical designations throughout the several figures, there is shown in FIGURE 1 a symbolic representation of the computer system according to the present invention which particularly emphasizes its parallel sequencing properties. The major computer portion, mechanized on the magnetic memory drum as later described, is shown in the dotted block 1 and includes a series of section groups, beginning at 2–1 extending through **2–*n*, only the first and the last being specifically illustrated. Each section group includes a series of sections, with sections 3–1 and 3–2 being arranged within section group 1. In the same way, section group 2–*n* includes a first section $N_a$, at 3–4, followed by a series of other sections, not specifically shown, concluding with a final section $N_i$, as indicated at 3–*n***.

A specific actuator is associated with each section group as, for example, actuator 4–1 with section group 2–1, and actuator **4–*n* with final section group 2–*n*. A commutator, shown dotted at 5**, is positioned between computer

1 and the series of actuators and serves to sequentially connect the section groups with their corresponding actuators through $S/Z$ and $R_1/R_2$ designated conductors. Finally, a series of vertical lines which are symbolic representations only, and designated sequence input and output code counts, are shown in computer 1. These lines serve to provide internal computational communication between the various sections and section groups. In particular, section **1–*a* produces output code counts under certain circumstances on the first vertical line 6–1, which, in turn, is in communication with all other sections. In the same way, as indicated, section 1–*a*** receives input code counts from certain other lines, each, in turn, represent output code counts from other of the sections.

Considering now, in brief, the manner of operation of the computer system, each section, at any particular time, may or may not be, as termed, active, that is, in the state of ordering an actuation cycle undertaken by its corresponding actuator. If active, the section will produce an electrical order during its commutation cycle on the $S/Z$ conductor going to its actuator, such as "Turn On," "Turn Off," "Step Forward," "Step Backward,'" etc., as programmed. Feedback signals on $R_1/R_2$ from the actuator will also be available to the section during its commutation cycle, based upon the actuators then existing state. Accordingly, when the ordered actuation has been completed, this information will be recognized as such by the section and the section will both go to an inactive status and produce an output code count, which, in turn, will be routed to other sections in the computer which are coded to receive that particular count.

Each section will count output code counts produced by certain other sections and/or itself, as determined by its input coding. Whenever a predetermined number of these counts has been made by a particular section, it will then acquire fresh data and go to an active status to again order an actuator control cycle undertaken. In general, only one section within a group will order that group's associated actuator actuated at any particular time. Thus, the actuation of each actuator is started in accordance with the completion of a predetermined number of actuation cycles and since each section may be in communication with all other sections through the input and output coding and counting, a parallel sequencing is obtained.

Two separate time modes are involved in the computation process. First, the commutator operates at a relatively slow rate, making, for example, one turn per second such that each actuator will be in communication with its associated section group once each second. On the other hand, the internal communication between all sections of the computer, arranged through the sequence input and output code counts, take place at a much faster rate than the commutator with the result that each actuation cycle, as completed, will normally be presented to all other sections within the computer before the following actuator is contacted by the commutator. Hence, although the actuators are sampled serially, the high internal computational rate enables an effective parallel type of computer operation to be achieved.

Figure 2:
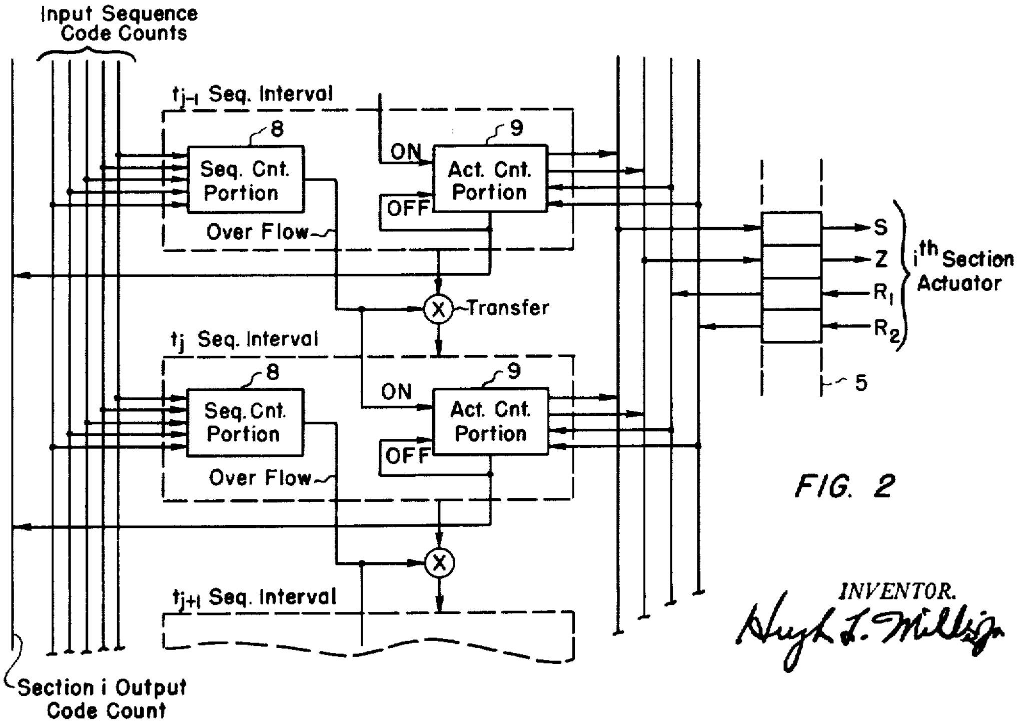
FIGURE 2 is a symbolic representation of the operation of a single section over successive actuation cycles.

In FIGURE 2 is shown the time sequence operation of a single actuator section. Here, section $i$ is shown, the upper block representing its sequence time interval $t_{j-1}$, and the middle block, its $t_j$ time sequence interval. Each section is divided into two major functional portions, the sequence code portion 8 and the actuator control portion 9. For understanding the time operation involved, assume that the $t_{j-1}$ actuator controlled cycle has been completed, a section $i$ sequence output code count made and the actuator control portion is in its "Off" or inactive condition. During this time, other sequence input code counts, coming from other sections, will be counted into the sequence count portion.

Whenever an overflow of this count occurs, an automatic transfer is made, as indicated, wherein new sequence count and actuator control data is entered into this section $i$ place in the computer. The transfer, as indicated, automatically brings in actuator control information which is in an active status with its associated section actuator and applies actuating signals over S and Z lines through the commutator to the actuator. As before, whenever the associated actuator has completed its predetermined ordered operation, as indicated by feedback signals to the section over the $R_1$ and $R_2$ lines through the commutator, the actuator control portion is turned "Off" from further operational relationship with its actuator and, additionally, makes an output sequence coded count $i$, which, in turn, will be picked up by preselected other sections. The inactive status will continue until, again, another predetermined number of input sequence counts are made by the sequence count portion, at which time another transfer will be made bringing in new data and turning "On" the actuator control portion for ordering another operational cycle of its actuator.

Figure 3:
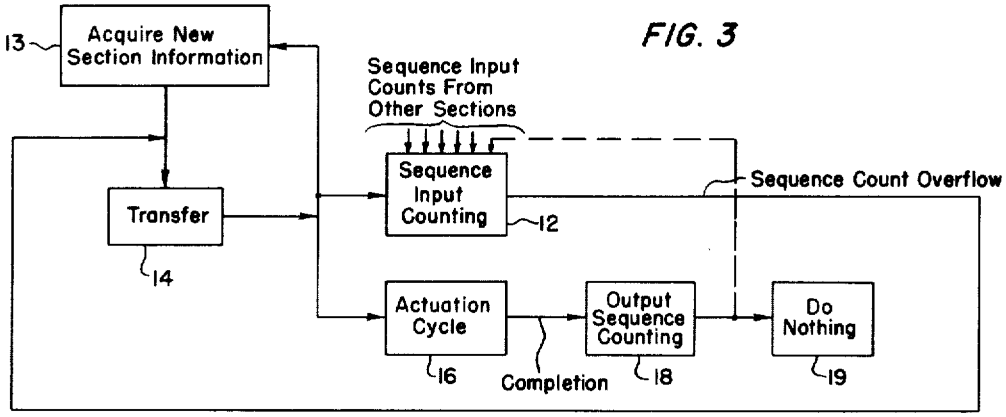
FIGURE 3 is another representation of FIGURE 2.

In FIGURE 3 is shown a more general diagram of the FIGURE 2 arrangement giving the order of operation of each portion of a section during a complete operational cycle. As indicated, the overflow from the sequence input count in block 12 orders the transfer of the next cycle data from the new section information block 13 through a transfer block 14. Upon completion of the transfer, new sequence input information appears in 12 and an actuation cycle is initiated, as indicated by block 16. Upon completion of cycle 16, an output sequence counting occurs at 18, followed by a do-nothing operation or inactive status in block 19. As indicated by the dotted line, the output sequence counting, made during block 18, may be coded for receipt by the section's input counting block 12.

B. GENERAL COMPUTER SYSTEM LAYOUT

1. *Mechanical arrangement*

Figure 4:
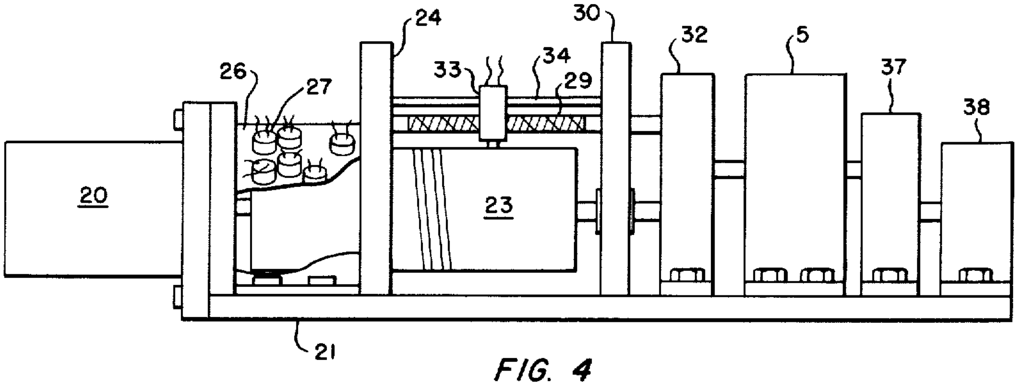
FIGURE 4 is a perspective view with some parts broken away, of the general mechanical arrangement of the computer system.

Referring now to FIGURE 4, there is shown a general mechanical arrangement of the computer system according to the present invention. A motor 20 is mounted horizontally on the left hand end of a base section 21. The motor shaft is coupled to a cylindrical magnetic memory drum 23 effectively divided into left and right hand portions by a middle vertical support 24. A magnetic reading and writing head mounting plate is indicated generally at 26 and supports a plurality of magnetic reading and writing heads indicated at 27, each in operative relationship with the magnetic coating on the drum 23 surface. A level wind drive shaft 29 is positioned between vertical support 24 and a right hand vertical support 30. It is driven at a predetermined speed relationship with drum 23 by a gear box 32, in turn, being driven by motor 20 via drum 23.

A magnetic reading head 33 is supported on a head support shaft 34 to mesh with the threads on shaft 29 and, accordingly, is driven right and left in accordance with the rotation of shaft 29. As will be later explained, head 33 will be driven relatively slow in the left to right direction to thereby read a previously recorded spiral track on drum 23 and will, at the end of its right hand travel, be driven rapidly in a right to left direction during which time its read information is ignored by the computer.

An output shaft from gear box 32 drives the actuator commutator 5, noted earlier in FIGURES 1 and 2, and shown in more detail in the following FIGURE 10. Additionally, this gear box 32 output shaft is coupled to another gear box 37 whose output shaft, in turn, drives a final spiral track selector commutator 38, shown in more detail in the following FIGURE 17.

2. *Electrical system arrangement*

Figure 5:
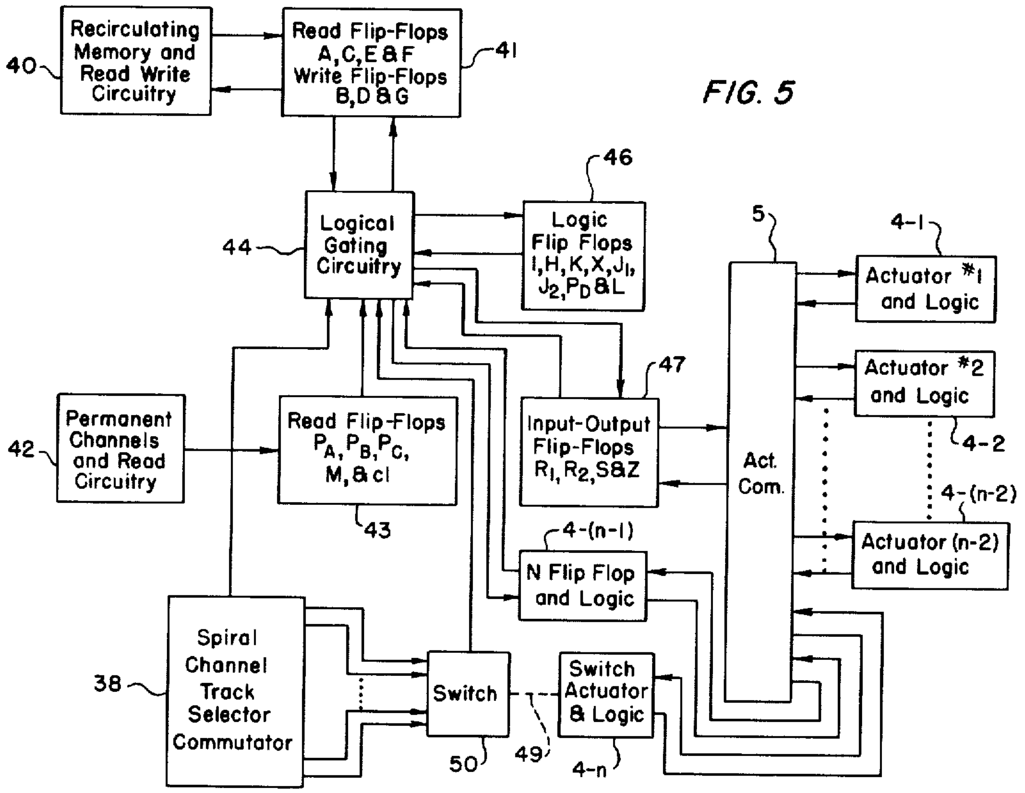
FIGURE 5 is a block diagrammatic representation of the electronic arrangement of the computer system.

In FIGURE 5 is shown the electronic system arrangement in block diagrammatic form. The recirculating memory, including read and write circuitry, is indicated at 40 and produces output signals for receipt by read flip-flops A, C, E and F in a block 41 and receives recording information from write flip-flops B, D and G, also in block 41. In the same way, the memory permanent channels and associated read circuitry, indicated in a block 42, apply output triggering signals to read flip-flops $P_A$, $P_B$, $P_C$, M and C1 in a block 43. The pair of complementary read signals produced by each flip-flop in blocks 41 and 43 are applied to the logical gating circuitry indicated in a block 44. Conversely, a pair of triggering signals are applied to each of memory write flip-flops in block 40 from gating circuitry 44.

Each of the logic flip-flops $P_D$, I, H, K, X, $J_1$, $J_2$ and L, indicated in a block 46, receive triggering signals on respective pairs of input terminals from gating circuitry 44, and their respective pairs of complementary output signals are applied back to the gating circuitry. Next, the input and output flip-flops $R_1$, $R_2$, S and Z, within a block 47, are in similar input and output signal communication with gating circuitry 44 and also apply signals through the commutator 5 to the various actuators and associated logic indicated at 4–1, 4–2, etc. The final pair of actuators are entitled the N flip-flop and logic 4–$n_1$ and the switch actuator and logic 4–$n$. The N flip-flop actuator is in signal communication with the gating circuitry while the switch actuator serves, as indicated by the dashed line 49, to position a stepping switch indicated at block 50. The spiral channel track selector commutator 38 includes a plurality of output conductors, which, in turn, are connected to switch 50. Output signals are applied from both commutator 38 and switch 50 to gating circuitry 44.

Figure 7:
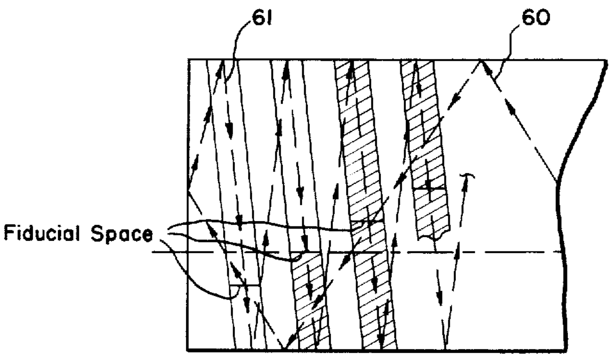
FIGURE 7 is a representation of a portion of the spiral track memory channel.
Figure 6:
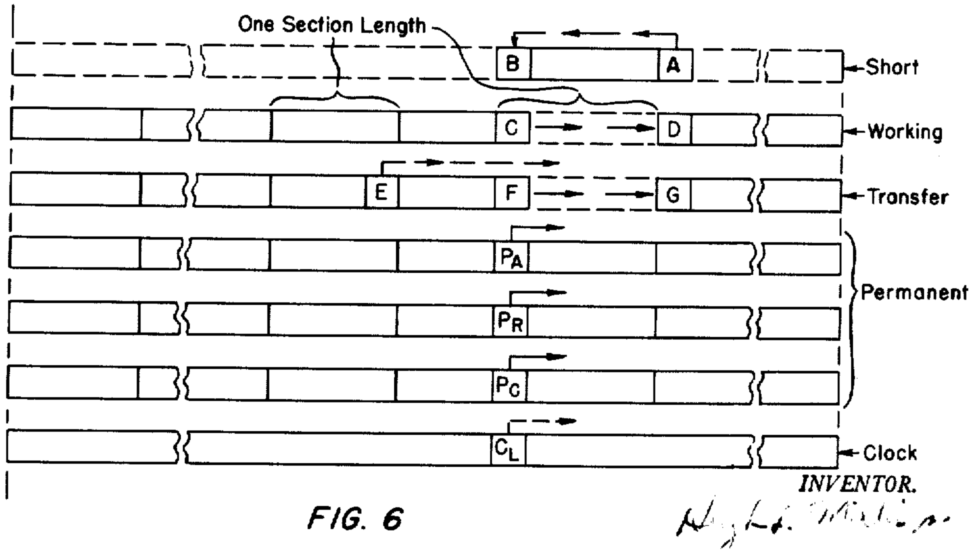
FIGURE 6 is a representation of the recirculating and permanent memory channel arrangements of the computer system.
Figures 8, 9:
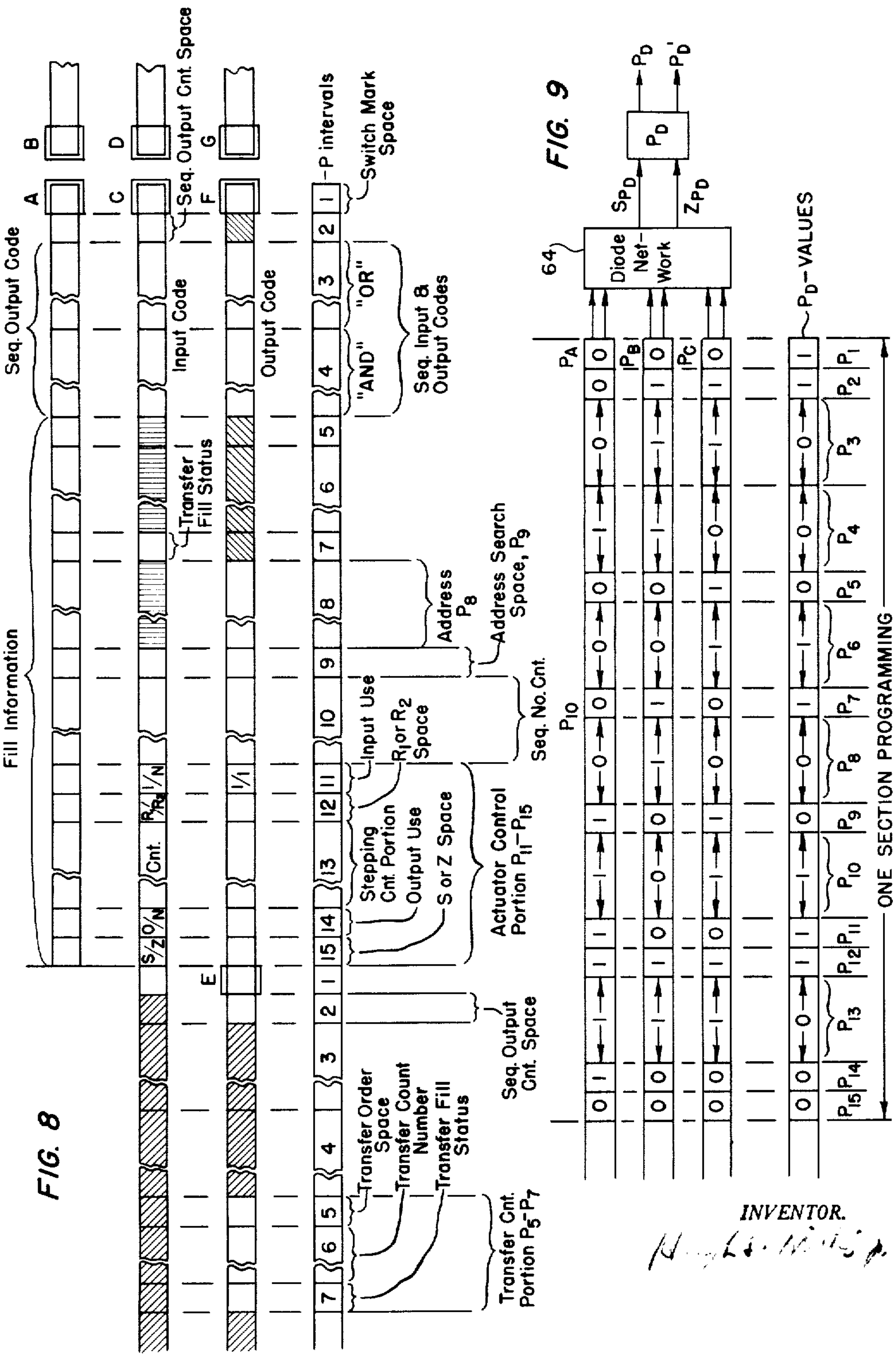
FIGURE 8 shows the permanent memory programming arrangement for one section.
FIGURE 9 illustrates the three permanent channels and their mutual programming of one section length.

Additional details of the various block diagrams shown in FIGURE 5 will be found in subsequent figures and described in more detail in connection therewith. For example, the actuator commutator and its relationship with the input and output flip-flops is shown in FIGURE 10, while typical actuators are shown in FIGURES 13*a* through 13*c*. The recirculating channel details are shown in more detail in the following FIGURES 6 and 8, while the spiral channel track selector 38 and switch 50 relationships are shown in FIGURE 17. The spiral channel details and its read flip-flops M are shown in more detail in FIGURES 7, 16 and 18, while the permanent channel details along with the $P_A$, $P_B$, $P_C$ and $P_D$ flip-flop operations are illustrated in FIGURES 6 and 9.

The logical gating circuitry employs the complementary output signals taken from all of the flip-flops, including the memory read flip-flops to provide triggering signals for all except the memory read flip-flops. The details of this gating circuitry will be developed throughout the specification as a part of the explanation of the detailed operation of the present computer system. This development of the gating circuitry will appropriately take place in the form of Boolean equations rather than in actual circuitry, and generally in unreduced form, for ease of understanding. As will be appreciated, Boolean equations in the digital computer field art define so exactly the gating circuit operation and mechanization that the inclusion of both equations and circuitry would represent equivalent, and, hence, redundant information.

For a development of Boolean equations with particular application to magnetic memory drum computers, reference is made to the book entitled "Logical Design of Digital Computers" by Montgomery Phister, Jr., published 1958 by John Wiley and Sons, Inc. However, the particular nomenclature herein employed will not follow the referenced book but correlation between the two sets of nomenclature will be obvious to those skilled in the art Two types of flip-flop equations will be employed, one for all memory "write" flip-flops and the other for all remaining flip-flops. In particular, the "write" flip-flop type of equation, used for flip-flops B, D and G, will comprise a single expression whose Boolean value determines the state of the "write" flip-flop during each succeeding clock interval. This type of expression is desired, since, in general, no relationship exists between the conduction state of a "write" flip-flop at any particular interval and its required conduction state for the next following interval. Hence, assuming the following equation, as an example only:

$$B = AC'P_1$$

signifies that if the right hand logic during the $P_1$ clock interval is "1," or "On," flip-flop B is to be "Set" at the beginning of the next interval. On the other hand, if the right hand proposition is "0," or "Off," the B flip-flop is to be zeroed at the beginning of the next interval. This is most conveniently mechanized as a normal gate, in this example, an "and" one, connected to the set input terminal of the B flip-flop and an inverter, or "nor" circuit, connected between the set input terminal and the reset or zero input terminal. If the "and" circuit is "1" for an interval, the "nor" output will be "0" and vice versa. Hence, the B flip-flop will be triggered, each clock interval, to correspond to the Boolean expression thus mechanized.

A pair of equations or Boolean expressions are required for all of the remaining flip-flops, as designated by S and Z, representing Set and Zero, respectively. For example only:

$$S_X = Y'Zcl$$
$$Z_X = YZ'cl$$

where $S_X$ denotes that the flip-flop X is to be "Set" if the right hand proposition is "1" or "On" during a particular interval, while $Z_X$ means that flip-flop X will be zeroed if the right hand proposition is "1," or "On." It will be understood that, in some progammmed intervals, only one equation will be required, especially where the flip-flop is, say, normally at one state and may or may not be triggered to its other state.

In mechanizing the equations, as will be understood from Phister, each mechanized S term is applied to the set input terminal of its associated flip-flop, while the mechanized Z expression is applied to the zero or reset input terminal of the associated flip-flop. The pair of complementary output signals of each flip-flop are designated by the letter employed for the flip-flop and the letter primed, respectively. Hence, the output signal and its complement of flip-flop A, as an example, are A and A', respectively.

Prior to actually writing out the detailed equations for each of the flip-flops, the permanent channel "read" flip-flops $P_A$, $P_B$, etc., are first discussed and their conduction state combinations are redefined in terms of $P_1$, $P_2$, etc., with these latter terms being used later in the remaining logical equations. This is done for the purposes of simplicity. Also, the clock term will be implied in all of the Boolean equations.

As an example of this:

$$S_K = (\qquad)P_A'P_BP_CP_Dcl$$

is written as:

$$S_K = (\qquad)P_Z$$

where the *cl*, or "clock" term, is implied and:

$$P_A'P_BP_CP_D$$

is shortened to $P_2$ in the second equation above.

Another shortened expression is sometimes used, again for purposes of simplicity, in setting out the memory "write" equations where the same memory operation is performed consecutively for a number of P programmed intervals. As an example only:

$$B = A(P_6 \text{ through } P_{10}), \text{ or } A(P_6 \rightarrow P_{10})$$

which denotes the following "or" expression:

$$B = A(P_6 + P_7 + P_8 + P_9 + P_{10})$$

Both of the above equivalent expressions simply mean that A is recirculated into B during the $P_6$ through the $P_{10}$ programmed memory intervals.

Since mechanization of the Boolean terms can take many forms, the equations derived are generally left in their unreduced state. The mechanization may be performed, as will be understood by those skilled in the art, by "and" and "or" diode gating circuits, as described in Phister, or, on the other hand, by "nor" gates employing resistors and transistors, and is also known in the art. The particular way of mechanizing the gating circuitry, as pointed out earlier, is immaterial to the invention of the present system.

3. *Magnetic memory channel arrangement*

*a. Recirculating and permanent channel arrangement.*—In FIGURE 6 is shown the recirculating and permanent memory channels arrangements, as indicated on the left hand division of the memory drum shown earlier in FIGURE 4. First of all, a short or A–B channel 52, exactly one section in length, is indicated having a "read" flip-flop A associated with its read circuitry, not illustrated, and a "write" flip-flop B associated with its writing circuitry, also not illustrated. In the figure, if the drum is assumed to rotate such that its surface, and hence the recirculating information moves in a left to right direction, the general short channel data movement will be A to B as indicated by the arrows. In this channel, as is the case with the remaining two recirculating channels, the dotted portion of the channel in the drawing represents the unused channel segment, that is, the portion of the channel where the previously written information has been read and is not again used.

Next, a working or C–D channel at 53 is associated with a "read" flip-flop C and a "write" flip-flop D. This channel extends around the drum except for one section, or A–B channel, length. A final recirculating channel, the C–D or transfer channel, is indicated at 54 and includes a pair of "read" flip-flops E and F and a single record flip-flop G. Flip-flops F and G are related to each other in the manner described for flip-flops C and D, while flip-flop E is associated with appropriate reading circuitry and reading head positioned the length of one section behind the flip-flop F head, and, hence, will produce the same output binary information as does flip-flop F, except one section earlier, timewise.

Three permanent programming channels are indicated at 55, 56 and 57, all extending completely around the drum circumference and being read by respective $P_A$, $P_B$ and $P_C$ flip-flops. Finally, the clock channel is indicated at 58 having a single read flip-flop C1 associated with it, whose signal serves, in the well known serial memory drum computer manner, to synchronize all reading, writing and logical flip-flop triggerings.

As will be later explained in more detail, the short or A–B channel serves to route each sequence output code count around to all sections for sequence input counting purposes, and, additionally, serves to acquire new section information, upon demand, from the spiral channel for insertion into the transfer or F–G channel. The C–D, or working channel, is primarily concerned with holding the sequence count and actuator control portions of all sections and is manipulated to maintain the sequence counts and actuator status of each section up to date in accordance with the actuator commutator movement. The transfer or F–G channel holds new section information for each section, the new information being immediately transferred to the C–D channel upon a sequence count overflow of its corresponding section. The $P_A$, $P_B$ and $P_C$ permanent channels, in conjunction with a $P_D$ flip-flop, serve to divide each section into 15 different programmed intervals, as required for the various operations performed by the recirculating channels. The permanent channel arrangement is later described in connection with FIGURE 9.

*b. Spiral channel arrangement.*—The general spiral track arrangement is indicated in FIGURE 7. The dotted line 60 indicates the high speed return path made by the spiral track head 39 during its right to left motion viewed from FIGURE 4. At the end of its left hand travel, the fine spiral portion of shaft 29 is encountered and the spiral track, indicated by dotted line 61, is then obtained. As will be later shown in more detail, the beginning space of one section only will be coded as a unique, fiducial mark, and this mark will represent, in effect, the beginning of each working and transfer memory recirculation. The point of coincidence of this fiducial mark with the spiral track information is indicated in the figure. Inasmuch as the working and transfer channel information will precess relative to the magnetic coating on the memory drum, since they do not extend completely around the drum circumference, a complete recirculation of the working channel information will not coincide with one complete spiral turn of track 61 but, rather, will appear earlier by the amount of their precession, which is one section length. Accordingly, successive fiducial spaces will be staggered, as indicated.

As will be later described, the information contained in the spiral channel represents fill information as required for each section in the F–G channel after its transfer to the C–D channel. By proper matching of addresses, new information may be acquired for each section as needed. In addition, portions of certain complete spiral channel tracks may be transferred to the C–D and the F–G channels in accordance with a channel fill operation, as also described later.

*c. Memory arrangement of one section.*—In FIGURE 8 is shown the detailed memory layout for a single section, all sections being identically programmed. In the figure, a permanent channel is illustrated, it being taken from flip-flops $P_A$, $P_B$, $P_C$ and $P_D$, and serves to divide up each section into fifteen different programming intervals, $P_1$ through $P_{15}$. The following FIGURE 9 serves to illustrate the relationships between $P_1$, etc., and $P_A$, $P_B$, etc. Only a brief description of this figure will be given at this time, since later detailed reference will be made to it in connection with the detailed description of various operations performed by the computer system. Intervals $P_1$, $P_2$, $P_5$, $P_7$, $P_9$, $P_{11}$, $P_{12}$, $P_{14}$ and $P_{15}$ are each of one timing or clock bit long, while each of the remaining programmed intervals will, in general, be more than one clock interval in length.

$P_1$ is designated the switch mark space, as determined by the values appearing in the C and F flip-flops. During $P_3$ and $P_4$, the input sequence code appears in the C flip-flop while the output sequence code appears in the F flip-flop. The address of the next fill information of the section is found in flip-flop F during the $P_8$ interval. The address search space is found in flip-flops C and F during the $P_9$ interval. The active sequence number count appears in C during the $P_{10}$ interval while the actuator control portion appears in flip-flop C during the $P_{11}$ through $P_{15}$ intervals. The breakdown of this actuator control portion has $P_{11}$ reserved for "input use or not use," or 1/0, $P_{12}$ for the $R_1$ or $R_2$ value or $R_1/R_2$, $P_{13}$ for the stepping count portion, $P_{14}$ for "output use or not use, or 0/N, and $P_{15}$ for the $S/Z$ output value.

The F–G channel holds the fill or next actuating cycle information for insertion into the C–D channel in its $P_8$ through $P_{15}$ intervals although only the $P_{10}$ through $P_{15}$ interval values are used by the C–D channel. The A–B, or short, channel holds output sequence code count information, whenever an output count is being made, in its $P_3$ and $P_4$ portions and, additionally, holds fill information taken from the spiral channel for one of the F–G channel sections during its $P_6$ through $P_{15}$ intervals, whenever a fill operation is underway. Finally, the F–G channel holds a transfer count portion during the $P_5$ through $P_7$ intervals during the passage of the next following section. In the figure, the vertically cross-hatched programmed intervals represent unused portions of the section, while the vertical cross-hatched spaces represent information reserved for the preceding and following sections along the channel.

*d. Permanent channel arrangement.*—The permanent channel arrangement for one section is shown in FIGURE 9 and will be similar for all sections. As mentioned earlier, three permanent channels are employed having associated "read" flip-flops $P_A$, $P_B$, and $P_C$. The output signals from these three flip-flops are applied to a diode gating network 64, which, in turn, applies set and zero signals to another flip-flop $P_D$, producing the usual pair of complementary output signals $P_D$ and $P_D'$.

The $P_1$ through $P_{15}$ intervals are formed by unique conduction state combinations of the four flip-flops $P_A$ through $P_D$, with the final $P_D$ values being indicated on the bottom line as employed in FIGURE 8. The Boolean equations defining the $P_D$ triggerings are:

$$SP_D=P_A'P_B'P_C+P_AP_B'P_C+P_A'P_B'P_C'$$
$$ZP_D=P_A'P_BP_C+P_A'P_BP_C'+P_AP_BP_C$$

Considering the $P_D$ flip-flop conduction state in conjunction with the permanent channel flip-flops, the following list of conduction state combinations, corresponding to the $P_1$ through $P_{15}$ intervals, is obtained from the figure:

$$P_1=P_A'P_B'P_C'P_D$$
$$P_2=P_A'P_BP_CP_D$$
$$P_3=P_A'P_BP_CP_D'$$
$$P_4=P_AP_BP_C'P_D'$$
$$P_5=P_A'P_B'P_CP_D'$$
$$P_6=P_A'P_B'P_CP_D$$
$$P_7=P_A'P_BP_C'P_D$$
$$P_8=P_A'P_BP_C'P_D'$$
$$P_9=P_AP_B'P_CP_D'$$
$$P_{10}=P_AP_B'P_CP_D$$
$$P_{11}=P_AP_B'P_C'P_D$$
$$P_{12}=P_AP_BP_CP_D$$
$$P_{13}=P_AP_BP_CP_D'$$
$$P_{14}=P_AP_B'P_C'P_D'$$
$$P_{15}=P_A'P_B'P_C'P_D'$$

As noted earlier, in the equations and drawings, these permanent programming states will be indicated by $P_1$, $P_2$, etc., which will refer to their corresponding detailed Boolean expressions in the above set of equations.

C. COMPUTER SYSTEM ARRANGEMENT, SPECIFIC

*1. Switch mark shift*

The shifting of the, as termed, switch mark is associated with the $P_1$ interval, the I flip-flop and the actuator commutator. The function of this operation is to associate each external actuator with its particular or associated section group through the commutator in order that output orders may be synchronously delivered by the computer to the actuator and that the section group may receive feedback values from its particular actuator. Hence, this operation represents the communicating or synchronizing link between the various external actuators and their respective section groups, as noted earlier in connection with FIGURE 1.

Figure 10:
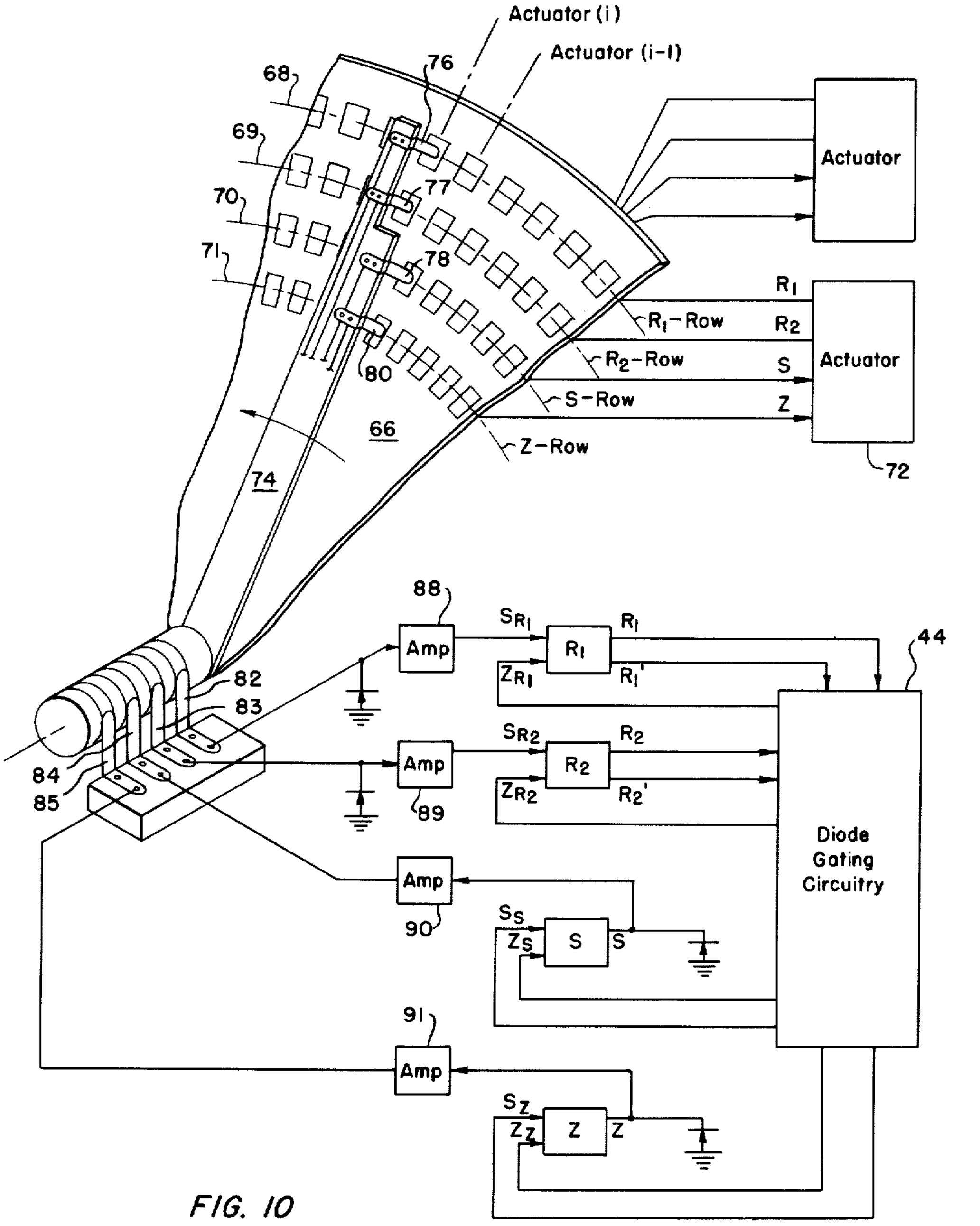
FIGURE 10 is a partly mechanical perspective, with portions broken away, and partly electrical schematic representation of the actuator commutator and associated computer input-output electronic portions.

In considering this operation, reference is first made to FIGURE 10 showing the actuator commutator in a partly perspective and partly schematic fashion. The commutator consists of a stationary circular plate 66 having four concentric rows of spaced commutator segments, the commutator segment rows being designated 68, 69, 70, and 71. There will be one column of commutator segments for each actuator, one actuator being schematically indicated at 72, coupled to the segments of its corresponding columns.

A commutator arm 74 is driven by the previously noted gear box 32 in FIGURE 4, not again illustrated, in a counter-clockwise direction, as viewed, and includes four brushes 76, 77, 78 and 80 on its outer end adapted to make respective contact with the commutator segment rows 68, 69, 70 and 71, respectively. However, brushes 76 and 77 are disposed laterally in advance of brushes 78 and 80 so as to engage the contact segments lying on the next adjacent column in the counter-clockwise direction. Brushes 76, 77, 78 and 80 are conductively coupled, in a manner not specifically shown, to respective slip ring and brush pickoff arrangements indicated at 82, 83, 84 and 85. Brush pickoffs 82 and 83 are coupled to the input terminals of a pair of amplifiers 88 and 89, respectively, whose output signals, in turn, are applied to the Set input conductors of the $R_1$ and $R_2$ flip-flops, respectively. The complementary output signals from the $R_1$ and $R_2$ flip-flops, in turn, are applied to diode gating circuitry 44, and also receive triggering signals from the gating circuitry on their respective zero input terminals.

The S and Z flip-flops receive triggering signals on both of their respective pairs of input terminals from the diode gating circuitry and their "On" output terminal signals are amplified by a pair of amplifiers 90 and 91, respectively, for application to the slip ring and brush pickoff arrangements 84 and 85, respectively.

Finally, diode clamps are shown connected between the input terminals of amplifiers 88 and 89 and ground and again between the S and Z output conductors of the respective S and Z flip-flops and ground. In operation, because of the staggered relationship of the segment contact arm pairs, the $R_1$ and $R_2$ actuator output signals from one actuator will be applied to the $R_1$ and $R_2$ flip-flops simultaneously when the S and Z input terminals of the preceding actuator are receiving triggering signals from the S and Z flip-flops and associated amplifiers. It is accordingly seen that during each interval that arm 74 passes a contact group, control information is both applied to one actuator while feedback information is received from the next actuator. Hence, considering the communication between any actuator and the computer, the feedback signals representing its operational state will be first delivered to the computer through the contact made by brushes 76 and 77 and then, during the next contact cycle, output actuating or programming information will be applied to it from the computer through the S and Z flip-flops.

Between contact cycles, that is, during non-contact intervals, when the four brushes are passing the land intervals, or dead areas, occurring between adjacent contacts, no communication exists between the flip-flops shown and the contact segments and, hence, actuators. It is during this non-contact time interval that the computer is active, that is, is recirculating the section group corresponding to the $R_1/R_2$ actuator information. During this active time, the computer determines, based upon the $R_1/R_2$ information picked up during the preceding contact interval what orders are to be placed in the S and Z flip-flops during the next commutator contact interval.

The clamping diodes are employed to indicate that the normal low voltage or "0" state of the S and Z flip-flops, and the actuator output $R_1$ and $R_2$ flip-flop signals are referenced to ground. This means, then, that positive triggering information only, that is, the binary "1" values, will be represented by signals having other than ground potentials while "0" values and the commutator non-contact positions will be at the same or ground potential. This, in turn, acts to drastically minimize the possibility of erroneous actuator and $R_1$ and $R_2$ flip-flop triggerings for the non-triggering or "0" conditions, particularly if medium to low input impedances are employed.

This primary relationship between the computer and commutator operation is shown in FIGURE 11*a*. Flip-flop I will be turned "On" at a predetermined $P_1$ space, during a non-contact commutator brush interval. At this time, the value of the actuator state corresponding to next section group to recirculate in the memory, that is, the one whose first section is appearing at the noted $P_1$ space, will be in the $R_1$ and $R_2$ flip-flops. This information will then be examined and used by the sections in the group in accordance with its particular values and the coding of the sections. Prior to the ending of the section group, at the next designated $P_1$ interval, still during the non-contact cycle, the S and Z flip-flops will have been appropriately triggered or not in accordance with the control information determined by that section group based upon the $R_1$ and $R_2$ values. At the end of the passage of the section group, flip-flop I will be triggered "Off" and the S and Z information will be applied during the next contact cycle interval made by the commutator arm to the input connections of the actuator, as indicated in the figure.

FIGURE 11*b* illustrates, in expanded form, a series of sections constituting a section group during its memory passage when flip-flop I is "On." As indicated, the information on the actuator's state is available to each section in the group in the $R_1$ and $R_2$ flip-flops, and, at the same time, any of the sections, in accordance with its particular coding, may order the S and Z flip-flops triggered. As is also indicated, the S and Z flip-flops will be zeroed at the beginning of the I cycle, while the $R_1$ and $R_2$ flip-flops will be zeroed at the end of the cycle in order to receive new information from the next following actuator.

In brief summary, since the section groups recirculate serially around the memory, and the actuators are serially coupled to the computer by the commutator, the successive intervals that the I flip-flop is "On" will precess or move one section group along the memory during each channel recirculation. Since the number of section groups equals the number of actuators, each time the commutator arm makes a complete rotation, the precession of I "On" along the section groups will always match the commutator movement and hence always be in alignment with its particular actuator. Since the I "On" will precess completely around the channel for each complete turn of the commutator arm, the actual number of memory drum turns will be less by 1 than the number of actuators. Accordingly, a gear down of $1/N-1$ between the memory drum and commutator arm is required where N represents the number of section groups or actuator columns on the commutator. This gear down function, as noted earlier, is performed by gear box 32 in FIGURE 4.

Consider now the I flip-flop triggering operation as performed in conjunction with the $P_1$ space. The $P_1$ space of the first section in each section group is coded by $C'F$ in the respective working and transfer channels. The $P_1$ space of each inner section, that is, a section other than the beginning section of a section group, is denoted by $C'F'$. The basic maneuver is to use a switch mark, denoted by the proposition CF, and have the I flip-flop, when "On" or I, move the switch mark around the memory exactly one section group. This is indicated in FIGURE 12*a*. Assume that the I proposition exists and sweeps across the particular section group then recirculating in the memory until the first $C'FP_1$ appears, representing the beginning of the next section. At this point, flip-flop I is zeroed to I', denoting "Idle," and, simultaneously, flip-flop D is "Set" to thereby write a new switch mark in the memory, and $P_1$ and $P_2$ are both zeroed to enable the next following actuator state to be picked up during the next commutator contact cycle. The Boolean expressions for these operations are:

$$Z_I = C'FP_1$$
$$D = C'FIP_1$$
$$Z_{R_1} \; \& \; Z_{R_2} = C'FIP_1$$
$$G = FP_1$$

The switch mark, written by the $S_D$ expression, is carried by the drum and upon its next appearance, as $CFP_1$, orders I "Set," S and Z both zeroed, and D zeroed to erase the then appearing old switch mark.

The expressions for this operation are:

$$S_I = CFP_1$$
$$Z_S = CFP_1$$
$$Z_Z = CFP_1$$

No expression is required for D, since it is to be zeroed, and the lack of an expression denotes an automatic zeroing operations, as will be understood from the previous description given for the form of memory write terms employed.

This I flip-flop operation, shown in FIGURE 12*a*, endlessly repeats and the section group recirculating during I is elevated to an operating or active condition while all section groups recirculating during I′ are inactive. Also, the commutator non-contact cycle must exist throughout each I interval, in order that all sections within a group see the same $R_1$ and $R_2$ values, and that any triggering of S and Z not be prematurely transferred to the wrong actuator contacts. Since the active status of each section coincides with its actuator contact by the commutator, as noted earlier, the I flip-flop serves to relate each section group with its corresponding actuator.

One final program CF′ is reserved for one $P_1$ space only, and represents the fiducial or beginning channel mark. The section following the fiducial mark will be an inner section of a group. The fiducial mark is needed for the channel fill operation, to be described later. The expression required for the D flip-flop to maintain this fiducial mark is:

$$D = CF'P_1 \text{ or } D = (C'FI + CF')P_1$$

2. *Actuator control portion of each section*

The actuator control portion of each section, appearing during $P_{11}$ through $P_{15}$ intervals, examines the $R_1$ and $R_2$ feedback information from its actuator and may apply triggering signals to the S or Z flip-flops in accordance with this information. From the earlier discussion, this examination will take place by the actuator control portion only during the active or I proposition. The detailed reasons for inclusion of each noted feature is not set out in detail at this time but will become more obvious later when various typical uses of the computer are given. Prior to this description of operation, reference is made to FIGURE 13 in which are shown three representative types of actuators, each of which may be controlled by an actuator control unit of a section.

In FIGURE 13*a* is illustrated a typical on-off type of actuator in which the S and Z commutator segments are coupled to the "On" and "Off" input terminals of a one bit memory device 94 which may be, for example, an electronic flip-flop, a relay, etc., but is, for the purposes of description, herein assumed to be a conventional electronic flip-flop. The "On" output terminal signal from flip-flop 94 is applied through an amplifier 95 to drive a motor 96. A tachometer may be coupled to the motor shaft and its output signal applied along with the "On" output terminal signal of flip-flop 94 to the two input terminals of "and" gate 98. The tachometer signal is also applied through an inverter or "nor" gate 99 to one input terminal of another "and" gate 100 while the "Off" output terminal of flip-flop 94 is coupled to the other input terminal of gate 100. The output signals of gates 98 and 100 are applied to the $R_1$ and $R_2$ segments, respectively, of the commutator associated with the actuator.

Assume initially that flip-flop 94 is "Off." In this condition, motor 96 will not be energized, no output signal will be produced by tachometer 97, and "and" gate 100 will produce an $R_2$ output signal. This $R_2$ signal will indicate the "Off" state of the motor. If, now, a triggering signal is applied to the S commutator segment, flip-flop 94 will be triggered to its "On" state, motor 96 will be energized and the $R_2$ signal will go "Off." Whenever a predetermined speed is reached by the motor, the output signal from tachometer 97 will open gate 98, hence applying a feedback signal on $R_1$ indicating that the motor is rotating at its preselected velocity.

In FIGURE 13*b* is shown a two-position actuator which, as indicated, includes a flip-flop 102 whose input terminals are connected to the S and Z flip-flop commutator segments and whose output terminals are connected to one input terminal of each of a pair of "and" grates 103 and 104. The ouput terminals of gates 103 and 104 are connected to, as designated, (+) and (−) input terminals of an amplifier 106. The (+ )and (−) designated output terminals of amplifier 106 are connected to respective (+) and (−) input terminals of a motor 108 whose shaft drives a lead screw 109, in turn, meshing with a load device 110. Load device 110 is adapted to contact a pair of limit switches on the two ends of travel, as indicated at 112 and 113. Limit switch 112 is connected to the other input terminal of gate 103 and is also coupled to the $R_1$ segment through a "nor" gate 106. Finally, limit switch 113 is connected to the other input terminal of gate 104 and is also coupled through a "nor" gate 107 to the $R_2$ terminal.

The amplifier and motor arrangement, both having (+) and (−) terminals may take a number of forms, as will be understood by those skilled in the art. The amplifier, for example, may comprise two D.-C. sections, each energized by the appearance of an input signal on its respectively designated input terminal. The motor would, following this example, having two windings each being selectively energized by a corresponding D.-C. amplifier portion of the amplifier. As an alternative, the amplifier might comprise a simple switching arrangement which would, in response to a signal applied to its (+) terminal, switch 3-phase power to a corresponding 3-phase motor in one fashion, while furnishing oppositely phased 3-phased signals to the motor when energized on its other input terminals. In both examples, the motor would rotate in opposite directions in response to the oppositely applied input signals.

As indicated, the actuator position in FIGURE 13*b* is at its (+) condition which, in terms of an actual embodiment, may represent "Open," "Up," "Out," "On," etc. As assumed, (+) corresponds to the "On" state of flip-flop 102 and an $R_1$ output signal will be produced. If the (−) state, representing, for example, "Closed," "Down," "In," "Off," etc., of the actuator is desired, then, a triggering signal will be applied from the Z contact to flip-flop 102 thereby turning it to its "Off" state. With this occurrence, a signal will be applied from gate 104 to the (−) terminal of amplifier 106 with motor 108 being thereby energized to drive lead screw 109 in its negative or (−) direction. Load 110 will be driven in the right hand direction until limit switch 113 is opened. The opening of limit switch 113 will de-energize "and" gate 104, turning off amplifier 110 such that no more energizing signals appear on its (−) conductor. It will be noted that the closing of limit switch 112, caused by initial movement of load 110, will cause the $R_1$ output signal to disappear and neither $R_1$ nor $R_2$ will be "On" during the travel of the load between its limit switches. When, however, limit switch 113 is contacted and, hence, opened, an $R_2$ signal will appear and thereby signify to the computer that motor 108 is "Off," and the load is at its (−) position.

Another typical type of actuator is shown in FIGURE 13*c* and represent a generalized, bi-directional stepping or multiposition type. It includes two basic portions, a logic section 120 and a motor section 121, both shown enclosed by respective dotted lines. The S, Z, $R_1$ and $R_2$ signal conductors are coupled to a diode logic box indicated at 123. A pair of actuator flip-flops $T_1$ and $T_2$ are also coupled to logic box 123. A pair of conductors, designated (+) and (−) are coupled from box 123 to an amplifier 124, whose respective (+) and (−) output conductors are applied to the corresponding two input terminals of a motor 125, within motor block 121.

A cam wheel arrangement 126 is directly driven by motor 125, while a stepping switch 127, as generally indicated, and a load indicated at 128 are driven by the motor after gear-down by a suitable gear-down arrangement, as indicated at 129. Cam 126 includes a circular detent along its outer periphery which is in engagement with a pair of roller actuated limit switches 130 and 131, each, in turn, receiving a $V_H$ potential from a $V_H$ terminal which corresponds to "1," or high voltage state of the flip-flops employed in the computer. A signal, $T_A$, from limit switch 130 is applied to logic box 123 directly and is also applied through a "nor" gate 132 to box 123. A $T_B$ signal, from limit switch 131, is likewise coupled directly to logic box 123 and also through another "nor" circuit 134 to box 123. The output conductor of an external gain control, comprising a potentiometer 136, coupled between a B-terminal and ground, is connected to amplifier 124. Finally, one contact point of a pair of adjacent switch points on switch 127 is connected to the $V_H$ terminal, while the other switch point is connected to circuit 123. One switch position, the fiducial one, of switch 127 acts to short the $V_H$ signal to this adjacent contact, for purposes to be described later.

The detailed operation of this actuator is best described in terms of Boolean equations as mechanized within the diode logic box 123. Briefly, however, the stepping operation results from the application of consecutive triggering signals from the commutator to the diode box. S values will cause the $T_1$ and $T_2$ flip-flop combination triggered so as to energize the (+) terminal of amplifier 124 with the result that output shaft of motor 125 will be driven one-half of a complete revolution. Such a movement will cause the output signals applied to the $R_1$ and $R_2$ terminals from logic box 123 to be reversed, that is, $R_1R_2'$ will go to $R_1'R_2$ and signal thereby that one cycle of motor 125 actuation has been completed. Additional S signals will cause motor 125 to be driven again in discrete half-turn increments and $R_1'R_2$ will go to $R_1R_2'$, to $R_1'R_2$, etc. Each reversal of the R values indicates a completion of the ordered actuation.

Z values, on the other hand, will cause motor 125 to be driven in the reverse, or negative, direction and each cycle will be similarly identified by reversal of the $R_1$ and $R_2$ values. Thus, the end of each cycle, whether positive or negative in direction, will be signified by a mere reversal of the $R_1$ and $R_2$ values, while the direction of actuation will be initially determined by whether the S or the Z signals were applied.

The sequence of $T_1$ and $T_2$ flip-flop actuations are given in FIGURE 14 where $T_T$ represents:

$$T_T = T_A T_B$$

The normal or "Idle" conduction state combination of the $T_1$ and $T_2$ flip-flops will be $T_1'T_2'T_T'$ during which state the motor is unenergized. Upon the appearance of a signal on the S input commutator segment, $T_1$ is ordered "Set" in accordance with the below expression:

$$S_{T_1} = T_2'T_T' \text{ (S commutator signal)}$$

This will result in a conduction state combination of $T_1'T_2'T_T'$, which will order, through the logic circuitry, a signal applied to the (+) input terminal of amplifier 124 with motor 125 being accordingly energized. Whenever cam 126 is driven by the motor such that limit switch 130 contacts the $T_A$ switch point, then the proposition $T_T$ will occur, which, in turn, in orders the $T_1$ zeroed in accordance with:

$$Z_{T_1} = T_2'T_T$$

The resulting expression, $T_1'T_2'T_T$, still orders motor 125 energized by amplifier 124 in its positive direction of rotation. This energization will continue until limit switch 131 drops into the opening on the periphery of cam 126, at which time $T_B$ will go to its "Off" condition with the $T_T'$ expression resulting. Accordingly, the original "Idle" expression of $T_1'T_2'T_T'$ will appear and no further energization of motor 125 incurred. The expression, mechanized within logic circuitry 123 for controlling the (+) energization of amplifier 124 is:

$$(+) = T_1T_2'T_T' + T_1'T_2'T_T$$

The mechanization of this equation is, of course, separate from the computer itself, and is unclocked, that is, the high voltage output level, appearing when its terms are satisfied, is assumed to operate the (+) portion of amplifier 124.

The application of a signal on the Z commutator contact will order a different cycle of operation in that the $T_2$ flip-flop is initially ordered "Set," as below:

$$S_{T_2} = T_1'T_T' \text{ (Z commutator signal)}$$

The resulting program, $T_1'T_2T_T'$ energizes amplifier 124 on its (−) terminal and again, when the proposition $T_T$ is obtained due to a sufficient rotation of cam 126 to cause both limit switches to engage their switch point, $T_1$ is ordered "Set," as below:

$$S_{T_1} = T_2T_T$$

The resulting expression, $T_1T_2T_T$ continues to supply (−) energization to the amplifier, and the motor will continue being driven until the term $T_T'$ again appears, at which time, both $T_1$ and $T_2$ are ordered zeroed, as below:

$$Z_{T_1} = T_2T_T'$$
$$Z_{T_2} = T_1T_T'$$

The logic ordering the (−) energization is:

$$(-) = T_1'T_2T_T' + T_1T_2T_T$$

The gating circuitry for acquiring $R_1$ and $R_2$ will be:

$$R_1 = T_A'$$
$$R_2 = T_B'$$

where $T_A'$ and $T_B'$ are derived from "nor" gates 132 and 134, respectively.

In addition to this normal $R_1$ and $R_2$ feedback logic, a reset signal indication is fed into the computer in which $R_1$ and $R_2$ are both simultaneously high, which corresponds to the $V_H$ and $T_C$ contact position of switch 127. The reason for this reset or fiducial switch position will be set forth later and the above equations $R_1$ and $R_2$ are, hence, expanded to become:

$$R_1 = T_A' + T_C$$
$$R_2 = T_B' + T_C$$

The uses of the bi-directional multi-state actuator will be outlined later although, in general, such an actuator may drive a multi-contact stepping switch, as indicated at 127, or may drive a load, having either rotary or linear motion, such as a valve, a potentiometer, a stop, etc., or both.

It should be noted at this point that each of the three types of typical actuators shown in FIGURES 13*a* through 13*c* will change their state, or will cycle to the next or other state, upon the application of a proper S or Z value. Also, each change of state or cycle completion will be represented by a corresponding exchange between the appearance of the $R_1$ and $R_2$ feedback signals. The actuators shown in FIGURES 13*a* through 13*c* are only representative and, in many cases, much simpler types, for example, relays, stepping switches, and the like, would be directly coupled to the commutator. The justification for showing the involved types here is one of generality based upon the fact that any and all types of actuations can be performed by the complicated types, whereas certain types of limitations exist for the simpler forms in some applications. As will also become more apparent during later discussions, the inclusion of multi-state or stepping actuators, as exemplified in FIGURE 13*c*, and their ability to be programmed in binary form by the present computer system, as described, greatly extends the sequencing abilities of the present system, and imparts a unique, outstanding capability to the system not presently shared with any existing sequencing technique.

Returning now to the description of the actuator control portion of each section, recirculating through the $P_{11}$ through $P_{15}$ programmed spaces, the general operation performed by an active section, is to sample the $R_1$ and $R_2$ actuator feedback values during the $P_{12}$ interval and if a change has occurred in their state, turn flip-flop X "On" to represent the step or cycle completion. X is then subtracted from the stepping number count during the $P_{13}$ interval. If an overflow occurs, X will be "On" at the end of the count and thereby signify that the particular cycle or number of cycles of actuation ordered by that section has been completed and this X "On" value is then employed to initiate the next operation, output sequence count, as described later. The $P_{13}$ count is employed to permit a number of cycles of actuation of a stepping switch with only a single actuator control cycle. Of course, for actuating a two-state actuator of the type shown in FIGURES 13*a* and 13*b*, the count would be initially full, and the first ordered $R_1/R_2$ change would result in the desired overflow.

Continuing this brief description, if no overflow occurs, and either $R_1$ or $R_2$ is high, the value in the $S/Z$ or $P_{15}$ space is then inserted into the S or Z flip-flops for ordering the next cycle of actuation.

Considering now in detail the operation of an actuator control unit, reference is made to the programming diagram in FIGURE 12*b*. First of all, C–D channel space appearing during $P_{11}$, termed $1/N$, will not be used during $P_{11}$ but is used during the next $P_{12}$ interval as it appears in D. Accordingly, the memory operation for the $P_{11}$ space is:

$$D=(CL'+FL)N'P_{11}$$

where, as will be described later, L' represents normal operation and L represents a transfer order in which new section information is brought from the F–G channel into the C–D channel. Hence, the normal operation during $P_{11}$ is to recirculate C into D.

The C value appearing during $P_{12}$ holds the last sampled $R_1$ or $R_2$ value where:

(C represents $R_1$)
(C' represents $R_2$)

The value of $R_1/R_2$ is not changed if:

$$(R_1+R_2)=0$$

since, under this condition, the actuator is in the process of completing its actuation cycle and hence is between its limit switches.

Before proceeding with the memory equations, the effect of D during $P_{12}$, corresponding to the value in C during $P_{11}$, must be considered. The proposition D signifies that the $R_1$ and $R_2$ flip-flop states are to be ignored and all changes in R will, accordingly, not be entered in the memory. A further restriction is that if C is coded to a "1" during this interval, then X is to be "Set," still assuming D, while the initial zero state of X will be maintained if C'. On the other hand, $D'P_{12}$ signifies "Use $R_1$ and $R_2$" and the new $R_1/R_2$ value will be entered, as described above. Concurrently with $D'P_{12}$, if there has been a change in R, X is to be "Set." Accordingly, the memory and X equations for $P_{12}$ interval are:

$$D=\{[[CD+(R_1+CR_1R_2)D']I+CI']L'+FL\}N'P_{12}$$
$$S_X=[CD+D'(CR_2+C'R_1)]IL'N'P_{12}$$

where N' is the flip-flop, whose function in the channel fill operation will be discussed later.

The X flip-flop value is subtracted from C during the appearance of the stepping count during the $P_{13}$ program and the memory and X flip-flop equations are:

$$D=\{[(CX'+C'X)I+CI']L'+FL\}N'P_{13}$$
$$Z_X=C'P_{13}$$

where (CX'+C'X) represents the normal Boolean term for subtraction.

At the end of $P_{13}$, if X is still "On," an overflow has occurred and the X flip-flop's state is carried through to the $P_2$ space of the next section to thereby order a sequence output count made, as indicated in FIGURE 12*b*. The C value, appearing during $P_{14}$, or $0/N$, determines whether or not the $CP_{15}$ space, holding the $S/Z$ value, is to be inserted into the S and Z flip-flops. In particular, $C'P_{14}$ denotes active while $CP_{14}$ denotes inactive, or ignore flip-flop C during $P_{15}$. When active, and the counter overflows, then X is ordered into D during $P_{14}$ to automatically turn a formerly active control portion into an inactive one during subsequent memory recirculations. This follows since the stepping count overflow signifies that the actuation of the associated actuator has been completed for that cycle, and no subsequent actuations are desired until the sequence input count number of the section overflows to thereby cause new actuator information transferred into the C–D channel. On the other hand, if X has previously overflowed, with $CP_{14}$ appearing as a result, this value is maintained in the $P_{14}$ memory space.

Another operation performed during this $IP_{14}$ interval, is to examine $R_1$ and $R_2$ for their reset condition, or $R_1R_2=1$, as explained briefly in connection with the multi-state actuator of FIGURE 13*c*. For purposes made clear later, if the reset proposition is incorporated in an actuator, X is to be "Set" at its appearance and the section inactive $CP_{14}$ status is to be ordered.

Accordingly, the memory and X equations for this $P_{14}$ interval are:

$$D=\{[(R_1R_2+C'X+C)I+CI']L'+FL\}N'P_{14}$$
$$S_X=R_1R_2C'IN'P_{14}$$

The $S/Z$ space appears in C during $P_{15}$. If the proposition D concurrently occurs, representing an inactive status, nothing is done as indicated by the "do-nothing" box in FIGURE 12*b*. On the other hand, if D', signifying active, the $S/Z$ value in C is placed into S or Z only if $R_1+R_2=1$. This latter restriction is necessary since, between the end of the commutator contact with the $R_1$ and $R_2$ segments, the actuator cycle may have been completed with either $R_1$ or $R_2$ being, accordingly, "On." If incomplete, then both $R_1$ and $R_2$ will be "0" and without the noted restriction, an additional triggering order might be applied to the actuator even though its actual cycle had ended.

Another restriction is also added at this point for sequencing flexibility purposes, in that whenever an $S/Z$ value is placed into one of the S and Z flip-flops for external application to the actuator, the opposite S or Z flip-flop, that is, the flip-flop not receiving the triggering signal, is simultaneously ordered zeroed. This enables the last active section within a section group to have ultimate triggering control of that section group's actuator. Quite obviously, if only one section is active, its output value will be decisive. The corresponding memory, S and Z equations for $P_{15}$ are:

$$D=\{(CL'+FL)I+CI'\}N'P_{15}$$
$$S_S=D'C(R_1+R_2)X'IN'P_{15}$$
$$Z_S=D'C'(R_1+R_2)X'IN'P_{15}$$
$$S_Z=D'C'(R_1+R_2)X'IN'P_{15}$$
$$Z_Z=D'C(R_1+R_2)X'IN'P_{15}$$

The remaining item to be discussed, namely, the disposition of the X proposition after overflow, is reserved for the next portion, Sequence Output Code.

Finally, as noted earlier, the subtleties behind the various, noted coding restrictions will become more clear later when various applications of the computer system are discussed.

3. *Sequence output code*

As was stated earlier, the completion of an actuation cycle will be signified by a stepping count overflow and the X flip-flop being "On" as the end of the recirculating section passes the C memory "read" flip-flop. The problem then is to communicate the completion of this actuation cycle to the remaining sections in order that those sections which are coded to receive the particular sequence output count may do so. The basic maneuver in making a sequence output count is to pick up the sequence output code from each section requiring such an output count in the short channel, as noted, and routing this sequence output code around past all sections, once, for counting purposes. The counting at each section is performed, in a manner to be discussed later, only if a matching occurs between its input code and the output code count held in the short channel.

Since only one actuation cycle, from one actuator, can be completed during each single turn of the memory, it would appear that the requirements for making a sequence output count are relatively straight forward. In practice, however, this is not the case since more than one section in a group may produce an output sequence count requirement during the same I active passage. This occurs since some sections within a group may be coded to perform other functions than merely controlling the actuator associated with its group and may overflow simultaneously with the section controlling the associated actuator. Examples of such other functions will be given later. Accordingly, in practice, because of this possibility, a general traffic control problem exists.

To resolve the traffic control problem, it is necessary that each X overflow and, hence, output count requirement be recorded and that such output count requirements be handled serially as they arise. After completion of each count, the erasure of the overflow mark must be made with an automatic search then undertaken for the next output count requirement, etc.

The traffic control problem is handled in the memory and reference is made to FIGURE 12*c*, in conjunction with FIGURE 8, for the memory programming arrangement for starting and stopping the sequence counts. The normal $P_2$ memory condition for no count is $E'C'$. Upon an overflow, the X flip-flop "On" state will be placed into G during $P_2$ and, hence, the record of the output count requirement will be contained in the $P_2$ space of the F–G channel of the following $(i+1)$ section, as indicated in FIGURE 8. This will result in $EC'P_2$ appearing during the next and subsequent memory turns until the sequence count is made.

For this X proposition recording function, the memory equation becomes: $G=(X+FA')N'P_2$ where $FA'$ retains the recirculation of the recorded "1" until erasure, as described later.

The H flip-flop is employed for programming required sequence output counts. $H'$ is its inactive status denoting that the next count requirement is being searched for. Accordingly, in 12*c*, whenever $EC'P_2$ appears in conjunction with $H'$, flip-flop H is ordered "Set" as is the D flip-flop. Accordingly, with H on, the sequence count is made during the next memory turn, in a manner described shortly. The original section first ordering the count will be recognized by the appearance of EC. At this point, since one turn has been completed, H is ordered zeroed to halt the sequence count, along with D. The E value must also be erased in order to get back to normal $E'C'$ condition, but cannot be erased at this point since it appears in the "read" flip-flop E. Its erasure must await its appearance in F during the next section $(i+1)$ appearance since F, and not E, goes into G.

To perform this erasure, the B flip-flop is ordered "Set" at the EC appearance and, during the next recirculation time of the short channel, the former $EP_2$ will appear in F in conjunction with A at $P_2$. At this point, both G and B are ordered zeroed and at the next section I appearance, the normal $E'C'$ state will appear in the memory, along with the normal $A'$. The equations defining the operation, as described, are:

$$B=ECHN'P_2$$
$$D=EC'H'N'P_2$$
$$G=(X+FA')N'P_2$$
$$S_H=EC'N'P_2$$
$$Z_H=ECN'P_2$$

The H flip-flop, as noted, orders the output count made and FIGURE 12*d* gives the memory operations controlled by the H flip-flop and the flip-flop H triggerings. During $H'$, titled "Awaiting Next Sequence Count," the following memory equations hold during the $P_3$ and $P_4$ programs:

$$B=E(P_3+P_4)H'N'$$
$$G=F(P_3+P_4)H'N'$$
$$D=C(P_3+P_4)H'N'$$

Now, since E is placed into B during $H'$, the section *i* output code will be in both the short channel as well as in the F–G channel whenever H is triggered "ON" by the prior noted program $EC'P_2$. The memory equations during the $P_3$ and $P_4$ intervals for the H program are:

$$B=AH(P_3+P_4)N'$$
$$G=FH(P_3+P_4)N'$$
$$D=CH(P_3+P_4)N'$$

In this arrangement, since A recirculates into B, the section *i* output code will be trapped in the short channel and, hence, will pass by the input code of each section as it normally recirculates from C to D. This input code recirculation will continue until the proposition $ECP_2$, as described above, again appears, which, in turn, represents one full turn of the working channel memory. At this point, H is zeroed and with $H'$, E again passes into B, etc. It will be noted that, since H is triggered "On" and "Off" at the same $P_2$ interval, each section's output sequence code can be seen by its input, and hence an input sequence count made, if so coded, based upon the completion of actuation of its own actuator. This property appears desirable for a number of different computer applications.

Next, it is necessary to discuss the details of the actual sequence count operation, made during H. Each of the input and output codes are broken into two sections, $P_3$ and $P_4$, and are treated logically during the matching process, as respective "or" and "and" operations. In general, the "and" portion may be used to group together those sections whose controlled actuators perform, owing to their relationship, what might be termed a subcycle of operation. Such a subcycle might include a tool change mechanism, the power connections to a machine tool, one station of a transfer line, etc. The "or" portion, in general, enables the actuators of the various sections constituting a particular subcycle to be distinguished from each other. Also, the "or" portion of the input code will enable each section to receive, as inputs, a plurality of different, other output codes.

The code matching process is outlined in FIGURE 12*e*, assuming the H proposition. During $P_3$, if C and F holding are simultaneously "1," K is turned "On," as an "or" matching has occurred. Then, during $P_4$ or the "and" portion, if C and F differ during any clock interval, K will be turned "Off." Accordingly, the equations for K are:

$$S_K=ACHN'P_3$$
$$Z_K=(AC'+A'C)HN'P_4$$

Finally, if any C and A values are simultaneously "1" during $P_3$, and the $P_4$ codes in both A and C are identical, K will be "On" at the end of $P_4$ and will later be subtracted from the sequence count number appearing during $P_{10}$. Since the sequence count number for the section may be either recirculating from C to D for the normal or $L'$ case, or be recirculating from F to D as it will when new section information is being placed in the C–D channel in accordance with L, K must be subtracted from the proper C or F flip-flop.

Accordingly, the equation for this subtraction is:

$$D=[(CK'+C'K)L'+(FK'+F'K)L]N'P_{10}$$
$$Z_K=(CL'+FL)N'P_{10}$$

Input sequence counts will continue to be subtracted from the sequence count number of a section until an overflow occurs, which will be represented by K being "On" following the end of the $P_{10}$ interval. As will be described in the next section, entitled Transfer and Fill, such an overflow will order a transfer operation made with new section information being transferred from the F–G to the C–D channel and the next actuation cycle thereby initiated.

*4. Section transfer and fill*

As indicated previously in FIGURE 2, whenever the sequence count portion of a section overflows, a new set of section information is employed for controlling the next cycle of the actuator operation. The new information for each section is found in the F–G channel directly beneath its active C–D information. Briefly, the L flip-flop is triggered "On" to order the transfer of the new information from F–G into C–D. The transfer count portion found in the $P_5$ through $P_7$ programs of the F–G channel, appearing during the following section's appearance in the memory, from FIGURE 8, enables a predetermined number of transfers to be made for new actuation cycles before new fill information must be acquired from the spiral channel. This feature is useful in certain sequencing problems for minimizing the number of spiral channel to F–G fill operations and, of course, will only be employed where identical actuation cycles occur a consecutive number of times.

As will be recalled, whenever a section's sequence count number overflows, the K flip-flop will be "On" as the section completes its passage from C into D. Since K is to be used almost immediately during $P_3$ and $P_4$ for the code matching operation for the section then appearing, its contents are transferred into X during $P_2$, and X then contains the sequence count overflow information of the preceding section.

The equations for placing K into X and zeroing K are:

$$S_X=KP_2;\ Z_X=K'P_2$$
$$Z_K=P_2$$

The next $P_5$ space, in the F–G channel, is employed to hold the sequence count overflow and the memory equation for this operation is:

$$G=XN'P_5$$

At the very next turn of the F–G channel, the E flip-flop will be "On" during the $P_5$ interval, causing L to be triggered "On" with the result that a general transfer from F into D takes place from there to the end of the section appearance. Since the L flipflop will be initially "Off," the equation for the triggering operation during this $P_5$ interval is:

$$S_L=EN'P_5$$

In addition, the L flip-flop is always ordered "Off" at the $P_{15}$ interval in order that it will be at L' during $P_5$, and this equation is:

$$Z_L=P_{15}$$

This will explain the earlier noted L and L' terms in the various memory equations in which F is transferred into D during L, and normal operations are performed during L'. It will also be apparent that since X is always transferred into G at $P_5$, the "1" originally written by X to indicate that a transfer was required will be automatically erased at the next memory turn, when L is set. As was earlier discussed, a sequence count, during $P_{10}$, can take place during the L ordered transfer by making the count take place from the F rather than the C flip-flop. Accordingly, no sequence count is lost during the transfer operation.

For the time being, the description of the transfer count taking place in G during $P_6$ will be omitted but will be later discussed after additional memory programming has been established in more detail. Assume, however, that whenever the transfer count overflows, in turn, denoting that the required number of transfers have been made for that particular set of fill data, X will be "On" during the $P_7$ interval and this "1" will be recorded in G, the equation for which will be given later. At the next F–G memory turn, the $P_7$ memory information will be EC', as indicated in the second block in FIGURE 15*a*, which represents "Need New Fill Information." FIGURE 15*a* sets forth the programming operation connected with the $P_7$ "Transfer Fill Status."

A pair of flip-flops, $J_1$ and $J_2$, are employed for programming the section fill operation during which information is transferred from the spiral channel to the proper section in F–G. These flip-flops are additionally employed, as later described, for programming the channel fill operation. As will also be later described, the flip-flop N state serves to distinguish between the section fill and channel fill operations, as mentioned previously.

During the presently described section fill, flip-flop N will be "Off" or N'. Whenever the proposition $J_1'J_2'$ appears, denoting an idle or neutral state, that is, when no transfer operation is being performed, the EC' in $P_7$ orders the J flip-flop pair programming changed by setting $J_2$ and, additionally, orders D set, as shown in FIGURE 15*a*. Accordingly, the next F–G turn will find the program EC during $P_7$ and this signifies "Fill Under Way."

The operation of the J flip-flop pair during the entire fill operation will be described shortly. In the meantime, however, whenever the proposition $J_1J_2$ appears, signifying that the short channel contains the new information for the section being filled, the appearance of EC will order both $J_1$ and $J_2$ zeroed, hence getting the J flip-flops back to "Idle" and will, also, order the D flip-flop zeroed and the B flip-flop set.

The zeroing of D will erase the C term of the expression EC but, as will be understood, the E term cannot be erased until it recirculates from F to G. To effect this, B is ordered set with the result that $AP_7$ will appear simultaneously with $FP_7$ and this coincidence employed to order both B and G zeroed. With this accomplished, then the original E'C' will thereafter appear during $P_7$ of that section until the next transfer count overflow.

The equations dealing with the $P_7$ interval, as just described in connection with FIGURE 15*a*, are:

$$B=ECJ_1J_2N'P_7$$
$$D=[EJ_1'J_2'+C(J_1J_2'+J_1'J_2)]P_7N'$$
$$G=(X+F)A'N'P_7$$

The $J_1$ and $J_2$ flip-flop programmings are shown in FIGURE 15*b* and their conduction states apply to the memory operations during only the $P_6$ through the $P_{15}$ intervals, since the earlier P programmed intervals were primarily the sequence input and output codes which are not changed during section fill. During the normal $J_1'J_2'N'$ program, the following memory operations of B and G are programmed:

$$B=EJ_1'J_2'(P_6\&P_8\rightarrow P_{15})N'$$
$$G=AJ_1'J_2'(P_8\rightarrow P_{15})N'$$

where the $P_6$ programming of G will be given later.

Whenever the proposition $EC'P_7$ appears with $J_1'J_2'$, as just noted, the $J_2$ flip-flop is ordered "Set" by the following equation:

$$S_{J_2}=C'EJ_1'N'P_7$$

The resulting program, $J_1J_2$, entitled "Search Spiral Channel" is then in effect with the following B and G memory programs:

$$B=AJ_1'J_2(P_6\&P_8\rightarrow P_{15})N'$$
$$G=FJ_1'J_2(P_8\rightarrow P_{15})N'$$

This switch of memory programs will trap the $P_6$ through $P_{15}$ contents of the section whose fill is required in the short channel, and, hence, the address appearing during $P_8$ will be available for search purposes.

The address trapped in the short channel represents the location in the spiral channel of the fill information for the section whose fill is required. A continuous matching process takes place during the search spiral channel mode, in which the $P_8$ address in the short channel is compared with the addresses in the spiral channel until the identical number is found. At this point, the information in the spiral channel is then inserted into the short channel, including the next following address, and this information is then returned to the F–G channel. This next following address, in turn, represents the location of the next following section fill information, following the use of the presently picked up information.

The matching operation is best explained in connection with FIGURE 16 in which a segment of the spiral channel is laid out along side the A–B channel. A "1" recorded in the $P_7$ space of the spiral channel means that the address following, during $P_8$, is to be sampled for matching, while a recorded "0" means that it is not to be sampled for matching. The reason for this restriction is based upon the fact that two different types of coding requirements will occur. First of all, if consecutive fill information for a section is arranged serially along M, then only a single address number for each fill segment would be required, and no ambiguities would result. That is, each pick-up would include the next address, in turn, followed by its associated fill information and next address, etc. On the other hand, at points of discontinuity, where the information following an address does not follow serially, then two addresses of the same number are involved, and the one picked up initially must be distinguished from the later one holding the next section fill information. This distinction is made, as noted, by the value in M during $P_7$. When such a break does occur from normal serial addressing, it will be indicated by $M'P_7$ and the memory spaces of the following section length in M will be blank and never used.

Considering now FIGURE 15*c* in conjunction with FIGURE 16, matching is performed, as noted, during the $J_1'J_2$ program and is accomplished by setting X "On" if $MP_7$ appears. Then, during $P_8$, X is zeroed if any corresponding pair of digits of the addresses appearing in A and M differ. This is given by:

$$S_X=MJ_1'J_2N'VP_7$$
$$Z_X=(AM_1+A_1M)J_1'J_2N'P_8$$

The signal V in the $S_X$ equation is produced by the channel fill commutator described later in connection with FIGURE 17. Its purpose, as will be seen, is to prevent erroneous matching to occur during the return, or right-to-left travel of the spiral head, when the spiral channel information is not being read.

Also, since X may enter any $P_7$ program in its "On" condition, from the $P_6$ subtraction to be detailed later, it must be specifically zeroed in $P_7$ unless the above $S_X$ expression appears in order to prevent an erroneous matching operation to occur during $P_8$. The $P_7$ zeroing expression is:

$$Z_X=(J_1+J_2'+M')N'P_7$$

which is the complement of the $S_X$ expression for $P_7$.

If matching does not occur, then X' will result at $P_9$, and at the next $P_7$, the operation will be repeated, assuming M. Whenever matching does occur, then flip-flop X will be "On" at $P_9$ and this, in turn, orders a change of state of the J program by ordering $J_1$ "Set" and $J_2$ zeroed. The equations for the $J_1$ and $J_2$ and X changes are:

$$S_{J1}=XJ_2N'P_9$$
$$Z_{J2}=XJ_1'N'P_9$$
$$Z_X=N'P_9$$

This results, as seen in FIGURE 15*b*, a $J_1J_2'$ program, during which the short channel is filled from M in accordance with the following memory equations:

$$B=MJ_1J_2'(P_6\&P_8\rightarrow P_{15})N'$$
$$G=FJ_1J_2'(P_8\rightarrow P_{15})N'$$

By the next $P_9$ interval, all of the M values appearing during the $P_6$ and $P_8$ through $P_{15}$ intervals will have been placed in the short channel. Accordingly, the J flip-flop program is again changed in accordance with the following equation:

$$S_{J_2}=J_1N'P_9$$

The resulting $J_1J_2$ program, entitled "Search for Original Section," programs the memory, as follows:

$$B=AJ_1J_2N'(P_6\&P_8\rightarrow P_{15})$$
$$G=FJ_1J_2N'(P_8\rightarrow P_{15})$$

This $J_1J_2$ program will be returned to the normal $J_1J_2'$ program at the appearance of the $ECP_7$ proposition, in the manner previously described. The J flip-flop equations for this change are:

$$Z_{J_1}=CEJ_2N'P_7$$
$$Z_{J_2}=CEJ_1N'P_7$$

It will be noted that the new information is held in the short channel during the $J_1J_2$ program and upon switching to the normal or $J_1'J_2'$ program, where A goes into G and E goes into B, the new information is automatically transferred to its proper place in the F–G channel.

The remaining portion of section transfer and fill operation to be described is the transfer count appearing during $P_6$. The problem here is that the transfer count number will be appearing in A during $J_1'J_2'$ and in F during the remaining $J_1$ and $J_2$ flip-flop programs. Accordingly, the subtraction of X from the transfer count number must be made in accordance with the $J_1$ and $J_2$ flip-flop programming states. The resulting equations for the memory and the X flip-flop are:

$$G=[J_1'J_2'(AX'+A'X)+(J_1+J_2)(FX'+F'X)]N'P_6$$
$$Z_X=[AJ_1J_2'+F(J_1+J_2)]N'P_6$$

where the $(J_1+J_2)$ term represents the reduced form of all of the remaining J programs, or $(J_1'J_2+J_1J_2'+J_1J_2)$.

*5. Channel fill operation*

The purpose of this operation is to get new sequence input and output codes, and actuator information to particular sections, as coded. Accordingly, any earlier programmed relationships between sections may be changed. This means that different sets of actuators can be controlled, assuming their connections are made to the commutator, or the same actuators may be controlled with different sequence relationships. This operation is basically controlled, from FIGURE 5, by the N flip-flop and logic $4-(n-1)$, switch actuator and logic $4-n$, and the spiral channel track selector commutator 38. This use of a pair of external actuators, controlled by the computer, to modify the computer's own basic logical nature represents an interesting departure from normal computer capabilities. Quite obviously, if the change made by the external actuators in the nature of the computer is too great, then, the computer would be incapable of switching itself back to its normal state and, hence, would remain frozen in its changed nature. This, of course, suggests the employment of the present computer to effect logical and program changes in computers other than and different from itself, based upon sequencing requirements in the other computer functions.

The track selector commutator, switch 50 and switch actuator and logic $(4-n)$ are shown in FIGURE 17. The commutator comprises a stationary circular plate 178 having a series of fixed commutator segments arranged around its outer edge, as indicated at 179. Also, an arcuate commutator track 180, positioned just inside the radius of the placement of the commutator segments, extends partially around plate 178 while a second arcuate commutator track 181 is positioned inside of track 180 and extends the remaining portion around plate 178. A shaft 184, driven through gear reducing box 37, from FIGURE 4, is connected to a commutator arm 185 having three brushes 186, 187 and 188, arranged to make conductive contact with the row of segments 179, arcuate segments 180 and 181, respectively. Three slip ring and brush arrangements are employed, as indicated at 190, 191 and 192, for applying signals to the respective brushes 186, 187 and 188. A voltage corresponding in magnitude to the potential or clamping level employed in the various flip-flops for representing the binary "1" value, indicated by a $V_H$ terminal, is applied to slip ring arrangements 190 and 192 while slip ring arrangement 191 is connected to ground.

Since shaft 184 is geared to the drum motor, it will be driven with a precise position and speed relationship to spiral head 33, and is initially arranged such that brush 187 will engage segment 180 during the return path made by the spiral track head during its non-operating right to left travel, as indicated previously in FIGURES 4 and 7. During this interval, a filter 194, connected to both segments 180 and 181 and furnishing the previously mentioned logical signal V, will be at ground potential and thereby prevent the X flip-flop from being triggered "On" at $P_7$ during any matching program. This, in turn, will prevent any spurious or erroneous matching from occurring during the return path made by the spiral head.

On the other hand, track 180 is initially arranged relative to the spiral head such that the $V_H$ signal will be applied to filter 194 during the normal left to right movement of the spiral channel head, hence, causing the signal V to be "On" and permitting the previously described matching operation to be performed, as required.

The series of commutator segments 179 are connected to corresponding fixed switch points within switch 50 and the switch points will, accordingly, exhibit temporary $V_H$ voltage levels during passage of brush 186 over their corresponding commutator segments. Switch actuator and logic block (4—*n*) will be controlled by the computer to position the movable arm of switch 50 to contact a preselected switch point, corresponding to one of the commutator segments. With this done, output signal U, appearing from switch 50, will take on a high voltage level during passage of brush 186 across the commutator segment selected by switch 50. A manually operated coupling to switch 50 is also shown for permitting the switch to be positioned manually, rather than by the computer.

Assuming switch 50 is set to the desired point, then, the N flip-flop, controlling this channel fill operation, must be "set" by its corresponding section group and is arranged such that it can be set only when an effective machine "Idle" exists, that is, H' and $J_1'J_2'$. The equation for setting N is:

$$S_N=J_1'J_2'H'$$

(commutator signal from N section group)

This means that successive signals will be applied, during consecutive spiral channel head cycles, from the N section to the "Set" gate of N until $J_1'J_2'$ and H' occur simultaneously, with the N flip-flop receiving a "Set" signal as a result.

After the N flip-flop has been set, the U signal from switch 50, appearing in coincidence with the fiducial mark will order a fill operation initiated. The U signal, as selected by switch 50, overlaps the fiducial mark of the particular spiral track holding the information to be placed into the C–D channel. The relationship between the signal U appearance and the spiral channel information is shown in FIGURE 18. As indicated, signal U appears every other fiducial mark appearance, formed, as will be recalled, by the proposition $CF'P_1$. The reason for this alternate appearance will become more apparent later although, in brief, the spiral channel holds the F–G channel fill information in the first memory turn following the U appearance and C–D fill information in the second turn.

The memory operations performed during the $J_1'J_2'NH'$ program are:

$$B=EH'J_1'J_2'N(P_2\rightarrow P_{15})$$
$$D=CH'J_1'J_2'N(P_2\rightarrow P_{15})$$
$$G=AH'J_1'J_2'N(P_2\rightarrow P_{15})$$

The memory operations during $P_1$ are identical for both N' and N since the switch mark is always stepped around the section groups in synchronism with the commutator. Accordingly, the memory equations given earlier in C. 1, Switch Mark Shift, still apply for the $P_1$ interval.

FIGURES 19 represents the programming diagram of the remaining portion of this fill operation. Upon coincidence of the fiducial mark and the U signal, assuming the proposition N, the $J_2$ flip-flop is ordered "Set" and the fill F–G channel operation will then be in effect. This $J_2$ flip-flop operation is given by the equation:

$$S_{J_2}=J_1'H'NCF'UP_1$$

The program, resulting from this triggering will be $J_1'J_2NH'$, which, in turn, furnishes the following memory orders:

$$B=AJ_1'J_2NH'(P_2\rightarrow P_{15})$$
$$D=CJ_1'J_2NH'(P_2\rightarrow P_{15})$$
$$G=FJ_1'J_2NH'(P_2\rightarrow P_{15})$$

With this memory programming in effect, the old information is recirculated and no new channel fill information is entered into the recirculating channels.

Whether or not a particular section receives new fill information is determined by the coding of the M channel during the $P_2$ interval. If "1" or M, the next appearing spiral channel information, through $P_{15}$, is to be transferred to the F–G channel. On the other hand, if "0" or $M'P_2$, the original $J_1'J_2NH'$ program remains in effect and the section information is not modified.

Upon the occurrence of $MP_2$, denoting a change of program, the $J_1$ and $J_2$ flip-flops are respectively "Set" and "Zeroed" in accordance with the below equations:

$$S_{J_1}=J_2NMH'P_2$$
$$Z_{J_2}=J_1'NMH'P_2$$

Then, during the resulting $J_1J_2'NH'$ program, the following memory operations are in effect:

$$B=AJ_1J_2'NH'$$
$$D=CJ_1J_2'NH'$$
$$G=MJ_1J_2'NH'$$

In the above, the A–B and C–D channel information is recirculated while the spiral track information is transferred into G to thereby get the new fill information into the transfer channel. In these three equations, the P terms are not required for preserving the switch mark, since, as next described, this $J_1J_2'$ program is switched back to the $J_1'J_2$ program at $P_{15}$, and hence will never occur during $P_1$.

At each $P_{15}$, the "fill" program is automatically switched back to the "Idle" by ordering the $J_1$ and $J_2$ flip-flops respectively "Zeroed" and "Set," as below:

$$Z_{J_1}=J_2'NH'P_{15}$$
$$S_{J_2}=J_1NH'P_{15}$$

Switching back and forth between the "Idle" and the "fill" programs during this basic fill F–G operation will continue in accordance with the spiral track information appearing during the $P_2$ intervals until the fiducial mark again appears, at which time, the fill F–G program is changed to the fill C–D program, still in FIGURE 19. The basic programming difference between the two fill orders is in the H flip-flop state and, upon the fiducial mark appearance, H is "Set" in accordance with the following equation:

$$S_H=J_1'J_2NCF'P_1$$

The new program $J_1'J_2NH$ is again the "Idle" portion of the Fill C–D channel in which the memory information in the channels is recirculated in accordance with the following equations:

$$B=AJ_1'J_2NH(P_2\rightarrow P_{15})$$
$$D=CJ_1'J_2NH(P_2\rightarrow P_{15})$$
$$G=FJ_1'J_2NH(P_2\rightarrow P_{15})$$

As before, the spiral channel value appearing during $P_2$ determines whether or not the fill program is programmed into operation. If $MP_2$ appears, $J_1$ and $J_2$ are "Set" and "Zeroed," respectively, as before in accordance with the below expressions:

$$S_{J_1}=J_2NHMP_2$$
$$Z_{J_2}=J_1'NHMP_2$$

During the resulting fill or $J_1J_2'NH$ program, the A–B and F–G memory channels are recirculated while the spiral channel information is inserted into the C–D channel, all in accordance with the following equations:

$$B=AJ_1J_2'NH$$
$$D=MJ_1J_2'NH$$
$$G=FJ_1J_2'NH$$

As previously, the fill portion of the fill C–D channel program is automatically switched back to "Idle" at $P_{15}$ by "Zeroing" and "Setting" the respective $J_1$ and $J_2$ flip-flops according to the following expressions:

$$Z_{J_1}=J_2'NHP_{15}$$
$$S_{J_2}=J_1NHP_{15}$$

As previously, the "Idle" and "fill" sub-programs of the major fill C–D program will continue to be switched back and forth in accordance with the $P_2$ spiral channel values for one full memory recirculation time, that is, until the next appearance of the fiducial mark, at which time a general machine idle is ordered by zeroing $J_2$, zeroing N, and zeroing H, as below:

$$Z_{J_2}=J_1'NHCF'P_1$$
$$Z_N=J_1'J_2HCF'P_1$$
$$Z_H=J_1'J_2NCF'P_1$$

The result of this last triggering operation returns to the original normal "Idle" of $J_1'J_2'N'H'$, in which the formerly shown memory recirculations hold.

It will be understood that the spiral channel information, contained between the portions actually transferred will be used for holding normal section fill information. In addition, the number of switch contacts in switch 50 need not include any more than is desired for different channel fill operations. Also, an overall or general machine idle can be obtained by throwing switch 50 to a switch contact position which is not connected to a contact point. Then, by ordering the N flip-flop set, which will be performed only during $J_1'$ $J_2'H'$, and idle condition, signal U will never appear, and the "Idle" program will continue indefinitely, since the section fill operation for which flip-flop N is primarily employed cannot take place. A manual switch, not shown, could be coupled to $Z_N$ and, when activated, switch N back to N' for subsequent operations.

6. *Typical computer specifications and features*

A set of general computer specifications, based upon reasonable computer electronic assumptions, may be set forth, for the purpose of obtaining a general picture of the computer capabilities and electronic requirements. If, for example, a 40" circumference drum were employed, corresponding to about 12" in diameter, with a reasonable pulse packing of 150 bits per inch, then a total of 6,000 bits would be stored around the drum periphery. Continuing, if 50 bits were allotted to each section, then the channel circumference would be divided into 120 section lengths, corresponding, in turn, to a total of 119 sections. Sixty actuators would appear a reasonable number, corresponding to 60 section groups having an average of substantially 2 sections per group. The gear-down relationship furnished commutator 5, from FIGURE 4, by gear box 32 would, accordingly, be 59 to 1.

If the drum were driven by motor 20 at 60 r.p.s., then the commutator would be driven at approximately 1 r.p.s., an extremely conservative figure for achieving long, reliable commutator service. Under this assumption, each actuator would be sampled once each second. On the other hand, if the drum were driven at 30 r.p.s., then a commutator speed of ½ r.p.s. would result and each actuator would be sampled once every 2 seconds.

The spiral channel length will primarily be a function of the degree of flexibility desired for the computer, that is, the number or complexity of different problems which the computer may be called upon to solve without having to refill its spiral channel. If, for example, the spiral channel were 3" in length and a track density of 10 tracks per inch were recorded, then a total of 30 tracks would be held on the spiral channel. This, in turn, would correspond to about 3,600 section lengths, allowing for suitable margins at the two ends of the track where head reversal takes place. On the other hand, with the same track density, a 2" spiral channel, comprising 20 tracks, would have a capacity of about 2,400 section fills. It will be appreciated that the capacity of the address register, appearing during $P_8$, would equal the number of sections stored on the spiral channel only if completely serial addressing were employed. However, since this will not be the case, that is, jumps in the addressing will occur, the capacity of the address register will be normally less than than the total number of sections available.

The 3" spiral channel would require a ½ second scan time based upon the right to left spiral head track movement, plus a much smaller time to return, in the right to left direction. In the same way, the total scan time for the 2" spiral channel would be slightly over ⅓ of a second for both directions of spiral head movement. Both of these scan times are less than half the normal 1 second actuator sampling interval noted for the 60 r.p.s. drum speed.

No predetermined speed relationship between the right to left and left to right head movements need be maintained since signal V, produced by channel fill commutator, separates the "read" from "return" movements. In the same way, the point of reversal at each end of the spiral head requires little or no mechanical tolerance again owing to the employment of signal V and the fact that the beginning of the first spiral channel section information need only coincide with the fiducial mark which can be arranged to take place a suitable time after the head movement reversal. The final section fill, recorded in the spiral channel prior to the right hand reversal is, also, noncritical and preferably, its scan will be completed well in advance of the reversal point.

Another feature of the computer system, as mentioned earlier, lies in the inherent error-free commutation technique employed. Only positive information, represented by discrete electrical signals, is transmitted to the S or Z flip-flops for their ordered triggerings. A ground potential is coupled to the set terminals of the flip-flops if no triggering is desired. Accordingly, the possibility of spurious triggerings, due to residual contact potentials, etc., are greatly minimized. The logic is also arranged such that, if, for example, brush bounce, or a poor contact, were made by a commutator segment and brush, with the result that no triggering information reached the S or Z flip-flops during a particular sampling interval, the computer wold continue to apply triggering signals until a good segment brush contact were made, and actuation accomplished.

In the same way, $R_1$ and $R_2$ "On" information is likewise signified by the presence of a signal, their "0" state being commutated as a ground potential through the commutator. Any brush bounce, poor contact, etc., occurring when an $R_1$ or $R_2$ state is passed through the commutator into the computer would correspond to $R_1+R_2=0$, and the computer would, accordingly, withhold any additional triggering signals until a positive input signal were obtained.

In summary then, triggering signals are not applied in the event of an input commutation cycle failure and, by the same token, output triggering signals will be applied continuously until positive action is obtained, signified by the receipt of feedback values. Hence, the computer system is logically independent of commutation errors.

7. *Discussion of computer system applications*

In considering various applications of the present computer system to sequencing problems, it is first necessary to discuss in more detail various coding possibilities for a typical actuator control portion of a section. This is true, since, in general, any broad systems application of the computer will involve the application of its actuator control portions to the general sequencing problem in a number of different ways. The particular uses to which a section is put to during any active cycle, is, of course, based upon its initial coding. Also, various initial coding possibilities exist for each section, as is obvious from the prior description of the operation of an actuator control section. Consider then, a few possible coding possibilities, but not all inclusive, and uses such codings might have in specific application to general sequencing problems.

A. *Normal case—1/N=0, 0/N=0.*—When a section is to control its actuator, the $P_{11}$ and $P_{14}$ spaces will be coded C' and the normal, as previously described, actuator control by the section will follow. This will continue until $0/N=1$, produced by the stepping number overflow at which time, the section becomes inactive and no longer applies actuating signals to its actuator.

B. *1/N=0, 0/N=1.*—This combination results at the completion of the normal operation in "A" above, as mentioned. An initial coding of this may be required when external events are to be counted and some other predetermined operation started after a predetermined number of counts. For example, packages passing in front of a light and photocell arrangement along an assembly line could be counted as $R_1$ and $R_2$ values and after a predetermined number of packages had passed, the resulting X overflow would then be routed as a sequence output count to other sections which, in turn, would be used to initiate further package loading or manipulations by other external actuators.

C. *1/N=1, $CP_{12}$, and 0/N=1.*—This coding arrangement does not use either the $R_1/R_2$ input values or apply $S/Z$ signals, but X is "Set" and counted each time, for achieving a real time count. This enables a sequence count overflow to be made after any predetermined elapsed time, in one-second intervals for the noted 60 c.p.s. drum speed embodiment. Such a capability enables, as one example, the actual time taken by another actuator in its operation to be compared against real time and, a failure to complete within the specified time may be determined for external indication, initiating other operations, etc.

D. *1/N=1, C' and 0/N=1.*—Here, no input, output, or counting operations will be performed by the section. Transfer, or new information, can be obtained for the section only by the sequence number overflow. This type of coding can be used for relating different subcycles of operation. For example, one operational subcycle may have all of the sections associated with it identified by one $P_4$ input number, while another subcycle's sections may be related by a different $P_4$ input code number. A dummy section, coded such as here described, could be used to communicate between the subcycles, based upon its sequence count overflow, by employing one $P_4$ code as its input and producing the other $P_4$ code as its output.

E. *1/N=1, $CP_{12}$ and 0/N=0.*—According to this coding arrangement, the input values are ignored but S and Z will receive triggering signals, according to $CP_{15}$, each commutation cycle until X overflows, since X will be counted each turn. This coding might be employed for driving a stepping motor, without using $R_1/R_2$ feedback, with the number of steps being determined by the initial magnitude of the stepping number count in $P_{13}$. This coding arrangement, since $R_1/R_2$ is not used, could be used for one section within a group, while another section in the group could be coded in accordance with "B" above, which uses as explained, only $R_1/R_2$. Separate actuators, of different types, would be coupled to the respective $S/Z$ and the $R_1/R_2$ contacts.

F. *1/N=1, $C'P_{12}$ and 0/N=0.*—Here, the $R_1/R_2$ input is ignored and $S/Z$ output values are applied to the actuator until the sequence code number of the section overflows and new information, accordingly, transferred in. Such a section coding could be employed for an actuator which has no switching element in it and might, for example, comprise a motor which would be "On" so long as the section continually dumped S or Z values across an associated input condenser-filter arrangement. The motor would stop running, for example, following a section transfer with no further application of signals to the condenser.

In addition to the various coding possibilities, as described above, two special features may be made use of in the application of the computer system to control problems. For example, the last active section in each group furnishes the final control information to that group's actuator. This enables a rudimentary decision process to be coded into the machine since, if two sections give conflicting orders, of opposite polarity, the final, active one will furnish the control information. As an example of use, assume that a ram is to be driven out and then immediately returned. The first section of a group would apply an active return signal while the second section would apply a forward signal. Accordingly, the ram, under control of the last section, would be moved forward and, upon completion of that movement, the last section would go into an inactive status and the earlier section would, then, order the ram returned to its initial condition.

This same result could be achieved by having the actuator input flip-flop connected as a counter. Then, the first signal, applied to its S terminal, for example, would cause the flip-flop to count and the actuator accordingly ordered forward. Then, following the completion of this movement, another S signal would be applied which, in being counted, would return the actuator flip-flop to its initial state with the ram being subsequently returned to its initial position.

As indicated earlier, the minimum cycle time, based upon a 60 cycle drum speed and 60 actuators, is one per second. This cycle time can be increased to $\frac{1}{60}$ of a second or to any $\frac{1}{60}$ fraction thereof by connections made external of the computer between the actuator sections. This is based upon the fact that the $R_1/R_2$ feedback value from one actuator and the $S/Z$ value to the next actuator appear simultaneously and, hence, external communication can be employed for control purposes. For example, the actuator to which an $S/Z$ order is applied would have its $R_1/R_2$ feedback values coupled to the corresponding commutator segments of the next following section. Thus, if the ordered actuation cycle were completed during the single, $\frac{1}{60}$ second, turn of the memory following the end of the first actuator contact and the beginning of the next, the completed order would be available in $R_1/R_2$ for immediate use at that time by the next following section group. Hence, the normal cycle time of one second is reduced to $\frac{1}{60}$ of a second. By similar external connections, which may be switched into operational relationship by other actuator sections, sampling intervals ranging from 1/60 of a second to one second can be achieved, in 1/60 second increments.

Since the sequencing technique employed in the present computer system is an incremental one, that is, is based upon changes of actual states rather than the actuator states themselves, it is desirable to indicate reset capabilities for all of the specified actuator types. This comes about since, before a different sequencing cycle is initiated, it is generally necessary to order all actuators forming a portion of that cycle into a predetermined arrangement of states in order that the coded sequence programming can then proceed, employing changes of state, but originally based upon a known set of initial conditions, or initial states. Starting of a different cycle may indicate an assembly operation of a different product, a start-up of an operation after temporary shut-down for repairs, etc. In practice, the acquisition of the desired set of initial conditions is generally most readily accomplished by going through a channel fill operation, etc., which may be specifically coded for that express purpose.

G. *Two-state actuators reset.*—Any two-state actuator, such as the "On" or "Off" motor of FIGURE 13*a*, or the two-position actuator of FIGURE 13*b*, will, at the onset of a reset operation, be in either one of its two states, the particular one assumed not being known. The rule employed to order the desired initial condition is to code an $R_1/R_2$ value in the $P_{12}$ space exactly opposite from the final state desired. Also, the stepping number count will be full such that a single flip-flop $K=1$ value will cause overflow and end of the active cycle. Finally, the initial $S/Z$ space will be coded to correspond to the state actually desired.

With this coding, if the state of the actuator is initially at its desired value, the differing $R_1/R_2$ values will cause K to be set with the immediate overflow count being produced, and the $S/Z$ space being ignored. On the other hand, if the initial actuator state is opposite from that desired, its $R_1/R_2$ value will match the coded $R_1/R_2$ value, with no stepping count being produced. The $S/Z$ value will be normally applied to the actuator to order it returned to its desired value. When this is accomplished, the change of $R_1/R_2$ will cause K to be set, with subsequent counting and overflow.

H. *Stepping or multiple-state actuator reset.*—The reset of a stepping type of actuator, as in FIGURE 13*c*, is readily accomplished since a special initial condition value of $R_1R_2=1$ causes an automatic overflow and sequence count, as described earlier in connection with the actuator control portion. The stepping number should be of a sufficient initial magnitude such that the active stepping, as performed, will include enough steps to guarantee passage of the stepping arm past its initial position contact points.

An automatic machine tool change mechanism is shown in FIGURE 20, for the purpose of illustrating one manner of performing an essentially serial sequencing problem by the present system. The application of the present system to parallel sequencing problems and to intermixed series and parallel problems will be more obvious after the description of this example. Also, it should be pointed out that the tool change mechanism, as described, represents an extreme breakdown of its required operation into discrete actuators. In practice, fewer actuators of the ingenious mechanism type, would probably be employed for grouping together various individual motions, as shown.

A chuck 200, holding a machine tool 202, is adapted to be opened and closed by a two-state actuator, A–1, and designated 203. A tool transfer mechanism is indicated generally at 204 and includes an upper arm 205 rotatably and slideably positioned in a sleeve 206. Another arm 210 is slideably mounted within a sleeve 208, in turn affixed to the upper end of arm 205. A tool grip 212 is disposed on the end of arm 210.

A two-position actuator 214, or A–2, serves to move arm 210 in and out of sleeve 208 to a pair of respective positions. Another actuator 216, or A–3, is arranged to move arm 205 up and down within sleeve 206, while still another actuator A–5, or 218, is adapted to rotate arm 205 within sleeve 206 between the directions of a rotatable tool storage bin 221 and chuck 200. Another actuator 220, or A–4, is adapted to actuate grip 212 between its open and closed positions. A series of drills 222 are arranged around the outer periphery of tool storage bin 221. A final stepping type of actuator A–6, is indicated at 224 and drives bin 220 stepwise in rotation to present any predetermined tool carried by it within the line of operation of tool change mechanism 204.

The initial conditions of the various actuators, prior to initiation of a tool change cycle of operation, are as follows:

A–2 is in, A–3 is up, A–4 is open, A–5 is rotated such that arm 210 is directed toward the tool, A–1 is "On," that is, tool 202 is gripped by chuck 200 and, finally, A–6 is rotated such that the storage space for the particular tool 202 is in line with tool change mechanism.

The operation sequence, based upon the initial conditions noted, is as follows:

A–2 is actuated out, A–4 is actuated to grip the tool, chuck 200 is released by A–1, arm 205 is brought down by A–3, arm 205 is rotated by A–5, grip 212 is opened by arm A–4, arm 210 is pulled in by A–2, storage bin 220 is rotated by A–6 until the next selected tool appears opposite grip 212, arm 210 is moved out by A–2, grip 212 is tightened on the selected sotrage bin tool by A–4, arm 205 is rotated by A–5 to the chuck direction, arm 205 is moved up by A–3, chuck 200 is tightened by A–1, grip 212 is released by A–4, and arm 210 is moved back by A–2.

The sequence above described is set forth in the following table:

| | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| 1. Chuck on/off | | | | −1 | | | | | | | | | | +1 | | | |
| 2. Arm in/out | | −1 | | | | | | +1 | | −1 | | | | | | +1 | |
| 3. Army up/down | | | | | −1 | | | | | | | | +1 | | | | |
| 4. Grip open/closed | | | −1 | | | | +1 | | | | −1 | | | | +1 | | |
| 5. Arm left/right | | | | | | −1 | | | | | | +1 | | | | | |
| 6. Storage bin | | | | | | | | | X | | | | | | | | |
| 7. Input | X | | | | | | | | | | | | | | | | |
| 8. Output | | | | | | | | | | | | | | | | | X |

The columns in the table represent cycle intervals and, as will be appreciated, represent independent time durations determined by the actuator response characteristics. The input and output rows in the table represent respective receipt of a proper input sequence code count for starting this tool change subcycle and the production of an output sequence code count representing the completion of the subcycle.

The sequential actuation of the various actuators may be characterized by a set of mathematical expressions which relate the various section groups, input and output sequence count codings, sequence count numbers, types of actaution, etc. Consider, for example, an expression for actuator A–1, controlling the machine tool chuck:

$$1a^{\mathrm{X}}_{\mathrm{X}}=2^{-}_{3\mathrm{X}}+({}^{+1}_{10\mathrm{X}}\rightarrow 1^{-1}_{6\mathrm{X}})$$

In the above expression, the left hand "1*a*" represents section *a* of section group 1, as arbitrarily assigned the control of the chuck. The superscript "X" in the left hand expression denotes the particular input code associated with the section 1*a*, while the subscript, also "X," represents the output code associated with each section. The "X" for both superscript and subscript simply means that the input and otuput codes assigned section 1*a* are identical.

Considering now, the first term of the right hand expression, which is "2," represents the initial actuator control code, the number "2" being employed to represent the completely inactive code, as described previously in paragraph D of Section 7 of this specification. In particular, it means that the input $R_1/R_2$ chuck values are ignored and no output values are applied to the chuck actuator.

The "—" appearing as a superscript simply denotes that the actuator is not controlled during this first interval of time. The subscript "3X" denotes that a total of 3X input code counts will be counted by the sequence count number before overflow and the acquisition of the next set of information. Referring to the table, it will be seen that the input count, the A–2 actuator count, and the grip A–4 count will be made during the very first cycle of operation and these three counts, in turn, will cause the chuck "3X" actuator number to overflow with the result that new actuator control information will be brought into this section 1*a*. This first or nonrecurring term in this expression, as in the other expressions, represents an initial condition situation required for the very first operational cycle, and may be obtained, for example, by a channel fill operation.

The parentheses around the right hand expression denotes that the actuating pattern indicated therein will be repeated indefinitely for all following subcycles of operation. The "1" appearing as the first term represents an active control cycle in that both input and output values are employed, as described in Section 7A. The "+1," in this case, denotes that the chuck actuator is to be ordered to its open, or +1 state, as defined. The "10X" subscript means that 10 sequence counts will be made prior to sequence number overflow, all of such counts, as will be appreciated, will be made following completion of the "+1" order. Since the output sequence count will be counted by the input sequence count of this section, the 10 sequence counts, including this cycle 4, will cause an overflow at the end of cycle 13 with the right hand term $$1^{-1}_{6X}$$

being brought into the section. This term will immediately order a "—1" actuaton of the chuck to its closed position and, following completion of this, the next 6 actuation counts, including its own count at the 14th cycle completion will bring back, including an input cycle 1 count, the first of the recurring terms $$1^{+1}_{10X}$$

Successive subcycles of tool change will accordingly employ the two terms in the parentheses, over and over again.

The corresponding expression for the A–2 arm actuator is:

$$2a^{X}_{X}=2^{-}_{X}+(1^{+1}_{6X}\rightarrow 1^{-1}_{2X}\rightarrow 1^{+1}_{6X}\rightarrow 1^{-1}_{2X})$$

The similar expression for the A–3 actuator operation is:

$$3a^{X}_{X}=2^{-}_{4X}+(1^{+1}_{8X}\rightarrow 1^{-1}_{8X})$$

The expression for the A–4, or grip actuator, is:

$$4a^{X}_{X}=2^{-}_{2X}+(1^{+1}_{4X}\rightarrow 1^{-1}_{4X}\rightarrow 1^{+1}_{4X}\rightarrow 1^{-1}_{4X})$$

The expression for the A–5, or rotate actuator, is:

$$5a^{X}_{X}=4^{-}_{5X}+(1^{+1}_{6Y}\rightarrow 1^{-1}_{10X})$$

The expression for the storage bin, or A–6 actuator, is:

$$6a^{X}_{X}=4^{-}_{8X}+(1^{i}_{16X}\rightarrow 1^{j}_{16X}\rightarrow 1^{k}_{16Y}\rightarrow \cdots)$$

Here, the *i, j, k* represent various stepping numbers as required for getting the required successive drills for the particular machining operation being performed.

The section employed for the input signal will have an expression:

$$7a^{X}_{X,Y}Y=2^{-}_{Y}+(2^{-}_{16X+Y})$$

The term X, Y means that this Section 7*a* is coded to receive both X and Y input counts, where Y represents an order to begin a tool change program. The non-recurring $2\overline{Y}$ term represents the first cycle order while the 16X in the recurring term is a type of fail-safe feature which requires that any preceding tool change cycle be completed before initiating the next cycle, as is ordered by a Y code appearance.

Finally, the output cycle will be mechanized by a section having the following expression:

$$8^{Z}_{X}=2^{-}_{16X}$$

Here, the Z superscript denotes that a different output code will be routed to other sections, after each completion of the drill change subcycle as will be generally required for proper sequencing of other subcycles or levels of machine operation.

The above set of coding expressions represent only one of many possible ways to accomplish the stated sequencing results. As an example, each of the actuators A–1 through A–5 could be controlled by two sections within a group, and thereby minimize section fill requirements.

The expressions for two sections controlling actuator A–1 are:

$$1a^{X}_{X}=2^{-}_{13X}+(1^{-1}_{16X})$$

$$1b^{X}_{X}=2^{-}_{3X}+(1^{+1}_{16X})$$

In the above, the 1*a* and 1*b* represent two sections of the first section group. After the completion of the very first cycle, the "16X" term in the right hand portion of both expressions will be endlessly repeated without requiring any spiral channel section fill operations, except as dictated by overflow of the transfer count number. Similar double expressions for the remaining A–2 through A–5 actuators may be readily worked out.

Whereas, the FIGURE 20 embodiment indicated how serial sequencing can be performed by using a corresponding number of parallel sections, FIGURE 21 indicates how serial sequencing can be performed with only two of the computer paralleled channels or section groups. It also indicates how the logic and power unit of an actuator of the type, exemplified earlier in FIGURE 13*c*, can be time shared to drive a plurality of motor and loads.

A pair of computer section groups, indicated at *i* and *i*+1, are associated through the commutator with respective logic and power units 230 and 231. Each of logic and power units may, for the purposes of example, be similar to the corresponding unit shown in FIGURE 13*c* with the five output conductors from logic and power unit 230 being connected to five respective movable switch arms of a five-section or wafer stepping switch indicated at 234. The first contact point on each of the switch sections are connected to the five corresponding input terminals of a motor unit 236 similar to the motor unit in FIGURE 13*c* and including, from left to right, gain, (+), (—), $T_a$ and $T_b$ terminals. The five output conductors of a motor unit 2, at 237, are connected to the second fixed contact points of the five switch rows. In the same way, additional motor units will be connected serially to consecutive switch contact rows of switch 234, as indicated by the dotted lines, with a final motor unit *n* at 239 being connected to the final, or last, row of switch points. Logic and power unit 231 drives a typical motor unit 240, whose load constitutes the movable switch arm of switch 234.

Since, as described earlier, the normal state of a logic and power unit is neutral, that is, it furnishes no plus or minus energization on its correspondingly designated output leads, logic and power unit 231 can energize motor unit 240 and drive the movable switch arm of switch 234 to any desired, pre-selected row without affecting the energization of any of the motor units connected to switch 234 during the switching operation. Accordingly, whenever a designated position is reached, the computer system can, then, order logic and power unit 230 to control the selected motor unit in any pre-determined fashion, such as forward or backward, and to any specified number of steps. After each such actuation, switch 234 can be driven to the next position and the motor unit corresponding thereto actuated through logic and power unit 230, in turn, controlled by section *i* of the computer.

It is, accordingly, seen that serial sequencing can be performed with only two actuators and corresponding section groups. The previous example shown in FIGURE 20 could well have been performed in the manner herein shown with a substantial saving in the number of logic and power units and associated computer sections since only two would have been needed, as contrasted with the six required there for the six actuators. This, of course, is true since only a serial sequencing requirement was indicated by the tool change mechanism. The gain control, as will be noted, enables the power unit output to be adjusted to meet the particular motor-load requirements of each motor unit. It will also be noted that switch 234 acts similarly to a commutator in that unit 230 can be serially coupled to the various motor units. The principle difference, of course, is that switch 234 is selectively driven in a programmed manner by motor unit 240 rather than continuously in the manner of true commutators and hence can remain at any selected point until the ordered actuation is completed.

FIGURE 22 represents a further extension of FIGURE 21 and indicates, generally, how an infinite number of motor units can be serially sequenced in any desired, or random order by, again, only two computer sections and corresponding actuators. Logic and power sections 230 and 231, motor unit 240, and switch 234 are again illustrated. Here, however, the switch arm of a switch 242, similar to switch 234 as shown detailed in FIGURE 21, is connected to the first row of contacts of switch 234, only one contact being specifically shown, while a motor unit 243 is connected to the second switch row. In the same way, the third and fourth switch contact rows of switch 234 are connected to the movable switch arms of a switch 244 and a motor unit 245 which drives switch 244, respectively. As further indicated, the switch contact points of switches 242 and 244 are connected to a series of motor units indicated 246, 247, 248 and 249, with other motors to other switch points connections being indicated by dotted lines.

The actuation of any motor, for example motor 246, is achieved by first activating motor 240 by section 231 until the movable arm of switch 234 contacts its second switch points, that is, the switch contacts connected to motor 243. Then, motor 243 is actuated by unit 230 until the switch arm of its associated switch section 242 is driven to contact its first set of contacts. Then, motor 234 is actuated to drive switch 234 to its first switch contacts with the result that logic and power unit 230 will be connected directly to motor 246 and its actuation by the computer will order the motor unit 246 actuated.

Thus, by proper sequencing of the two logic and power sections, 230 and 231, the motors may be energized in any particular, random, serial sequence. To indicate the number of motors that can be controlled in the arrangement shown in FIGURE 22, assume that switch 234 has 20 contact rows. This means, then, there will be 10 switches in the column formed by switches 242 and 244. If each of these switches, in turn, has 20 contact rows, then a total of 200 motor units can be serially sequenced. If, continuing, the motor column were replaced by another column of switches similar to 242 and 244, and each of these switches, in turn, drove motor units, then a total of 2,000 motor units could be serially controlled in any desired sequence, still, by only a pair of logic and power sections, as shown.

Having discussed two different methods of meeting serial sequencing requirements by the present computer system, consider now the more general sequencing problem involving a combination of both parallel and series requirements. Assume, for example, that actuators A and B are to be initially actuated together. Then, C is to be actuated when A only has completed its cycle, D is to be actuated when both A and B have completed their cycles of operation and, finally, E and F are to be simultaneously actuated when A, B and C have finished their actuation cycles. In coding such a problem, the A and B output codes would employ the same $P_4$ number but have different "or" $P_3$ values. C, then, would be coded to pick up the A output code while D would be coded to pick up both the A and B output codes and would require accordingly two sequence input counts for its actuation. The C output code value would also be unique in its $P_3$ value with E and F being programmed to pick up B and C for their actuation. It is, accordingly, seen that a combined series and parallel type of sequenced operation can be readily programmed by the computer by employing a proper selection of input and output code values with appropriate sequence count numbers.

FIGURE 23 illustrates an additional use of the computational technique embodied by the computer system according to the present invention for achieving both error-free operation and registering attempted errors. In this embodiment, it is assumed that three separate, identical computers are mechanized in accordance with the present invention employing three respective sets of recirculating memory channels, as indicated in the figure. A voting network 260 is interposed between each of the separate computer logical networks, indicated at 261 for computer No. 1 and 263 for computer No. 3, with computer No. 2 being indicated by dotted lines.

In particular, voting network 260 determines a single triggering signal for each of the B, D and G writing flip-flops but based upon the respective triggering orders produced by all three computers. The decision is that the write signal will correspond to the majority of the triggering orders, that is, to the two out of the three ordered signals. This means that if the B flip-flop were ordered "set" by two computers and zeroed by the third computer, all B flip-flops would receive the "set" order. Hence, assuming only one computer to make an error during any given clock interval, that error made will be eliminated in the memory write order. Also, the voting network also orders the S or Z flip-flops "set" in accordance with the majority of the computer orders for these two flip-flops.

The unreduced voting equations are:

$$B=B_1B_2B_3+B_1B_2B_3'+B_1B_2'B_3+B_1'B_2B_3$$
$$D=D_1D_2D_3+D_1D_2D_3'+D_1D_2'D_3+D_1'D_2D_3$$
$$G=G_1G_2G_3+G_1G_2G_3'+G_1G_2'G_3+G_1'G_2G_3$$

In the above equations, the $B_1$, $B_2$, etc., terms refer to the output triggering signals for the $B_1$ write flip-flop, $B_2$ write flip-flop, etc., as produced by the appropriate computer gating networks.

An error register is associated with each of the three computers as output actuators, with registers 265 and 266 being illustrated for computers 1 and 3, respectively. In particular, register 265 includes a pair of flip-flops $W_{1A}$ and $W_{1B}$. The "set" terminal of flip-flops $W_{1A}$ is connected to voting network 260 and receive a signal, in accordance with an expression to be set forth later, whenever the voting network determines that a memory write order produced by computer No. 1 differs from similar orders produced by computers No. 2 and No. 3. The reset or zero input terminal of flip-flop $W_{1A}$ is connected to the Z connection of the commutator segment associated with the computer's section No. 1. Flip-flop $W_{1B}$ is connected to count the flip-flop $W_{1A}$ actuations and will reverse itself once for each two reversals of flip-flop $W_{1A}$.

The equations for the voting network portion for applying signals to the inputs of the three error indicators are:

$$S_{W_1}=(B_1'B_2B_3+B_1B_2'B_3'+D_1'D_2D_3+D_1D_2'D_3'+G_1'G_2G_3+G_1G_2'G_3')$$

$$S_{W_2}=B_1B_2'B_3+B_1'B_2B_3'+D_1D_2'D_3+D_1'D_2D_3'+G_1G_2'G_3+G_1'G_2G_3'$$

$$S_{W_3}=B_1B_2B_3'+B_1'B_2'B_3+D_1D_2D_3'+D_1'D_2'D_3+G_1G_2G_3'+G_1'G_2'G_3$$

Since the $R_1$ and $R_2$ commutator segments are connected to the two respective output terminals of the second flip-flop in each of the error registers, an input count will be made for each reversal of these flip-flops. Assume, for exampde, that an error is made by computer No. 1 and flip-flop $W_{1A}$ is triggered. Assuming $W_{1B}$ is initially "1," this reversal of $W_{1A}$ will cause $W_{1B}$ to change its state, which, in turn, will be counted in the stepping number of section No. 1. At the same time, a zeroing signal will be applied to $W_{1A}$ from the Z commutator segment to thereby return it to its zero state. Accordingly, the next error made will "set" $W_{1A}$ again, which will reverse $W_{1B}$ again with another count being thereby made. Hence, consecutive errors made by each of the three computers will be registered as decreases of their initial stepping number magnitudes and determination of the number of mistakes made by each of the computers can be made at any time by examining these stepping number counts. The number of such counts permissible before closing down the machine, owing to one of the computers, for example, breaking down and, hence, producing a large number of errors, is a matter of choice as transfers can be coded into each of these error sections.

A shutoff channel is indicated which will be coded to receive the sequence counts made by sections 1, 2 and 3. Whenever a predetermined number of sequence counts has been made by this shutoff channel, as coded, the ensuing transfer operation will provide actuating information for its associated actuator. This actuation will act, as indicated, to turn-off the computer by opening a power supply switch and routing the input power from the power supply to an indicator, such as a dial panel light. Hence, the computer can be programmed to close itself down following any predetermined number of errors made by it.

In considering the computer systems as described, it is apparent that a number of modifications may be made in its detailed structure and arrangement without affecting in any way the scope of the invention present. For example, the number of section groups, the number of commutator segments, the spiral channel length, the drum speed, etc., are all matters of engineering choice and will, in practice, be determined by the general class of problems the computer is designed to solve.

The typical set of actuators set forth were given by way of example only. The flip-flops indicated in the actuators, might in a large class of applications, be relays with the $R_1$ and $R_2$ signals coming from appropriate contacts. In the same way, the stepping type of actuator could be formed by a stepping switch, for switching rather than load driving applications, actuated in single steps forward or backward by respective S or Z signal applications. $R_1$ and $R_2$ feedback signals could be taken from alternate contact rows. In the same way, static switching devices including "and" and "or" logic, etc., could be employed for the off-on or position type of actuators.

Since the computer input and output requirements are based upon logic only and are not dependent upon the specific type of mechanism employed, various mixtures, such as normal electronic flip-flops, as described, relays, stepping switches, static switching devices, etc., may all be intermixed and still operated by the computer. Also, a single section may drive not only a single actuator element as described, but may, assuming proper external logic, order the actuation of an entire subcycle of operation, such as, for example, one station of a transfer line. In this application, the computer would simply start the subcycle, which would proceed independently of the computer but would, by the arrangement of its logic, signal the completion of its subcycle of operation to the computer in the defined $R_1/R_2$ manner. Also, in many cases, such subcycles might involve an analog or ingenious mechanism type of actuator which would, itself, undergo various internal sequencing operations although driven by a single source of power.

Certain sections of the computer could be allotted to receive external error signals produced by, for example, an overload relay or fuse, a slip clutch or other elements employed for sensing various types of mechanical malfunctions. Upon receipt of such an error signal, an automatic shutdown procedure could be inaugurated by the computer, after an automatically programmed channel fill operation, for example. Hence, external fail-safe operation can be programmed into and solved by the computer.

The computer applications specifiically noted barely touch upon its full scale range of possible uses, as will be appreciated. No limitation of uses is intended, however, since, as noted earlier, the present computer capabilities are intended to handle a wide range of sequencing problems, ranging from automatic assembly and transfer lines to missile checkouts, etc., as is appropriate for a general purpose sequencing computer. For this reason, the present computer might be compared, by analogy, to the well known general purpose arithmetic computer, which is able to solve an extremely wide range of scientific and data handling problems. A partial listing of sequencing problems capable of being solved by the present computer include assembly and transfer lines, all types of auxiliary functions, so termed, of individual machine tools, actual sequencing of various operations performed within a missile or aircraft during both flight and checkout, missile launch station sequencing, ordering and checkout, etc. Operation of pallet loaders, warehouse loading and unloading operations, etc., are other sequencing examples which the present system is capable of programming.

The complete computer system, as described, may be obviously simplified, in certain respects, by omitting some of its component portions as may be desired for certain simplier problems. For example, if the spiral channel is omitted, along with the section transfer count, then the section and channel fill operations will be omitted and a simpler computer, but still capable of sequencing, would result. The logic for these operations, if left in the computer, would still not interfere with the remaining simplified computer and its operations. In general, the elimination of the spiral channel and fill operations, would require considerably more sections per group for any typical problem with a subsequent decrease in the overall number of actuators controlled by the computer. Such a computer could solve problems of the type detailed for the machine tool change in FIGURE 21 where, after the initial operation, the remaining operations endlessly repeat for each ordered subcycle.

Another possible simplification would be to share several identical computers as described with a single spiral track which would include fill information for all of the computers. This is primarily possible since the spiral track flip-flop M performs a "read" function only, and hence its contents may be simultaneously examined by several paralleled sequencing computers.

If the present system offers a generalized solution to sequencing processes as it appears to do, then its application to automation should cause significant changes in the application, use and design of sequenced automation systems. For example, in accordance with the present system, the basic sequencing process is degraded to a mere, routine, computer programming or coding process compared to the presently required special purpose logical design and mechanization for each specific sequenced system or sub-system. Then, too, the mechanical and electro-mechanical design of the various elements entering into a sequenced system can be made more independently of each other than is now the case. That is, the mechanism designer can more fully concentrate on each piece at the time of its design and would have to no longer maintain an overall detailed picture of the sequencing requirements of the entire system into which the piece must later fit. Then, too, the actuator logical connections can be designed as an entity of, and concurrently with, each individual mechanical and electro-mechanical element of a sequenced system. This is true since the sequencing order output characteristics from the computer are known in advance and are not determined later when the special purpose, wired sequencing network is designed.

The application of this type of sequencing computer to automation techniques should enable the individual elements composing automatic machines to be more readily standardized since their input, output, logical and power requirements can be standardized and this in turn, should enable essentially the same types of elements, perhaps of different sizes, employed in different combinations to form different machines. Then, too, the ability to time share amplifiers, certain logic, power supplies, etc., as shown in several of the examples where serial sequencing requirements exist, should bring about a general reduction of machine complexity and bring about improved reliability.

Finally, the computer portion of the present system, as described, can be readily tied into other types of digital computer systems, as will be needed for more generalized automation requirements since it includes the usual digital components, and employs normal memory iteration speeds, clock rates, etc. These other computer types include computers for controlling high speed servo loops of milling machines, for example, now classed as numerically controlled, and various business machines, for handling inventory, accounting and other essentially business problems. It, of course, is also capable of being computationally related with other similar, sequencing machines, as will be required for controlling completely automatic factories.

*8. Summary of computer Boolean equations*

As noted earlier, the gating network of the present computer system is precisely defined by the Boolean equations written for the set and zero input terminals of the various logic and memory write flip-flops. These Boolean equations have been developed throughout this specification in accordance with the descriptions of the various computer operations and below is found a summary of them, but by flip-flops. The equations for $P_D$ and $P_1$ through $P_{15}$ are not again listed. In a number of instances, certain obvious simplifications have been made by the use of logical identities.

$S_I=CFP_1$ $Z_I=C'FP_1$ $S_H=J_1'J_2NCF'P_1+EC'N'P_2$ $Z_H=J_1'J_2NCF'P_1+ECN'P_2$ $S_K=ACHN'P_3$ $Z_K=P_2+(AC'+A'C)HN'P_4+(CL'+FL)N'P_{10}$ $$S_X=KP_2+J_1'J_2MN'VP_7+[D'(CR_2+C'R_1) +DC]IL'N'P_{12}+R_1R_2C'IN'P_{14}$$

$$Z_X=K'P_2+[AJ_1J_2+F(J_1+J_2)]P_6+(J_1+J_2'+M')N'P_7 +(AM'+A'M)J_1J_2N'P_8+N'P_9+C'P_{13}$$

$S_L=EN'P_5$ $Z_L=P_{15}$ $S_{J_1}=J_2NMP_2+XJ_2N'P_9$ $Z_{J1}=CEJ_2N'P_7+J_2'NP_{15}$ $S_{J_2}=J_1'H'NCF'UP_1+C'EJ_1'N'P_7+J_1N'P_9+J_1NP_{15}$ $Z_{J2}=HJ_1'CF'NP_1+J_1'NMP_2+CEJ_1N'P_7+XJ_1'P_9$ $S_N=J_1'J_2'H'$(commutator signal from N section group)

$Z_N=HJ_1'J_2CF'P_1$ $S_{R_1}=$(actuator commutator brush)

$Z_{R1}=C'FIP_1$ $S_{R_2}=$(actuator commutator brush)

$Z_{R2}=C'FIP_1$ $S_S=D'C(R_1+R_2)X'IN'P_{15}$ $Z_s=CFP_1+D'C'(R_1+R_2)X'IN'P_{15}$ $S_Z=D'C'(R_1+R_2)X'IN'P_{15}$ $Z_Z=CFP_1+D'C(R_1+R_2)X'IN'P_{15}$ $$B=A(P_1+P_5)+[ECHP_2+(ER'+AH)(P_3+P_4) +ECJ_1J_2P_7+(EJ_1'J_2'+AJ_1'J_2+MJ_1J_2' +AJ_1J_2)(P_6\&P_8\rightarrow P_{15})]N^1+[EH'J_1'J_2' +A(J_1J_2'+J_1'J_2)]N(P_2\rightarrow P_{15})$$

$$D=(IC'F+CF')P_1+C(P_5+P_6)+[EC'H'P_2+C(P_3+P_4) +\{EJ_1'J_2'+C(J_1J_2'+J_1'J_2)\}P_7+(CL'+FL)(P_8+P_9 +P_{11})+\{(CK'+C'K)L'+(FK'+F'K)L\}P_{10} +\{((CD+(R_1+CR_1R_2)D)I+CI')L'+FL\}P_{12} +\{((CX'+C'X)I+CI')L'+FL\}P_{13} +\{((R_1R_2+C'X+C)I+CI')L'+FL\}P_{14} +\{(CL'+FL)I+CI'\}P_{15}]N^1 +[CH'J_1'J_2'+CJ_1'J_2+(CH'+MH)J_1J_2'](P_2\rightarrow P_{15})N$$

$$G=FP_1+[(X+FA')P_2+F(P_3+P_4)+XP_5 +(J_1'J_2'(AX'+A'X)+(J_1+J_2)(FX'+F'X))P_6 +(X+F)A'P_7+((AJ_1'J_2'+F(J_1+J_2))(P_8\rightarrow P_{15})]N^1 +[AH'J_1'J_2'+FJ_1'J_2+(MH'+FH)J_1J_2'](P_1\rightarrow P_{15})N$$

It will be appreciated, of course, by those skilled in the art, that the foregoing disclosure relates only to a detailed preferred embodiment of the invention whose spirit and scope of the invention is set forth in the appended claims.

What is claimed is:

1. A device for ordering the changes of state of a series of actuators according to any predetermined sequencing pattern, each of said actuators having at least two steady state conditions, and responsive when ordered for changing its steady state condition, said device comprising: a series of actuator control means corresponding to said series of actuators, respectively, each of said actuator control means being responsive, when actuated, for ordering the change of state of its associated actuator and including means responsive to the completion of change of state of its associated actuator for producing an output signal indication; a series of sequence counting means associated with said series of actuator control means, respectively, each of said sequence counting means being responsive to a predetermined number of input signal indications for actuating its associated actuator control means; and a series of communicating means corresponding to said series of actuator control means, respectively, each of said communicating means routing the output signal indication produced by its associated actuator control means to predetermined sequence counting means of said series of sequence counting means whereby the changes of state of said series of actuators are ordered in accordance with a predetermined sequenced pattern.

2. A device for ordering the changes of state of a series of actuators according to a predetermined sequencing pattern, each of said actuators being normally at one of at least two steady state conditions and responsive to an applied signal indication for changing its steady state condition, said device comprising: a series of actuator control means corresponding to said series of actuators, respectively, each of said actuator control means being responsive when actuated for producing a signal indication for application to its associated actuator, each of said actuator control means being responsive to the completion of the change of state of its associated actuator for producing an output signal indication; commutator means for applying the signal indications produced by said series of actuator control means to said series of actuators, respectively; a series of counting means corresponding to said series of actuator control means, respectively, each of said counting means being responsive to the receipt of a predetermined number of input signal indications for actuating its corresponding actuator control means; and selective coupling means for selectively routing the output signal indications of each of said actuator control means to preselected counting means of said series of counting means whereby completions of the change of state of various actuators of said series of actuators cause others of said series of actuators to be ordered actuated.

3. A computational device for ordering the actuation of a series of actuators according to a predetermined sequencing pattern, each of said actuators being normally in a steady state condition and responsive to each applied signal for actuating into another steady state condition, said computational device comprising: a first series of actuator control means corresponding to said series of actuators, respectively, each actuator control means of said first series of actuator control means being normally in an active condition for applying a predetermined number of actuating signals to its associated actuator and then going into an inactive condition and applying no further actuating signals to its associated actuator, each actuator control means of said first series of actuator control means producing a first output signal when it goes from an active to an inactive condition; a second series of actuator control means corresponding to said first series of actuator control means, respectively, each actuator control means of said second series of actuator control means being normally in an inactive condition but responsive to the receipt of a second signal for going to an active condition and applying a predetermined number of actuating signals to the actuator associated with its corresponding actuator control means in said first series of actuator control means; a series of sequence counting means corresponding to said first and second series of actuator control means, respectively, each of said sequence counting means being responsive to a predetermined number of input signals for applying a second signal to its corresponding actuator control means in said second series of actuator control means whereby its corresponding control means orders the next actuation of the corresponding actuator; a series of computational paths corresponding to said first series of actuator control means, respectively, each computational path of said series of computational paths coupling its corresponding actuator control means to predetermined sequence counting means of said series of sequence counting means; and means for applying the first output signal produced by each actuator control means of said first series of actuator control means as input signals to its corresponding computational path whereby the second signals produced by said series of sequence counting means causes the actuations of said series of actuators to take place in accordance with a predetermined sequenced pattern.

4. A device for ordering the changes of state of a series of actuators according to any predetermined sequence pattern, each of said actuators having at least two steady state conditions and responsive when ordered for changing its steady state condition, said device comprising: a series of pluralities of actuator control means, corresponding to said series of actuators, respectively, the actuator control means in each of said pluralities of actuator control means following one after the other, each actuator control means in each of said pluralities of actuator control means including first means responsive when actuated for ordering the change of state of the actuator corresponding to its associated plurality of actuator control means, and second means responsive to the completion of change of state of the corresponding actuator for both inactivating said first means and producing an output signal indication; a series of pluralities of sequence control means corresponding to said series of pluralities of actuator control means, respectively, the plurality of actuator control means in each of said series of pluralities corresponding to the plurality of actuator control means, respectively, in its corresponding series of actuator control means, each sequence control means in each of said pluralities of sequence control means including normally inactive means but responsive when activated for receiving a predetermined number of input signal indications and responsive to the receipt of said predetermined number of input signal indications for simultaneously de-activating itself, activating the first means in the next following actuator control means in its corresponding plurality of actuator control means and activating the next following sequence control means in its plurality of sequencing control means; and a series of communicating means for said series of pluralities of actuator control means, respectively, each of said series of communicating means applying each output signal indication produced by the second means in each of said series of pluralities of actuator control means to predetermined activated means in said series of pluralities of sequence counting means whereby the changes of state of said series of actuators are ordered according to a predetermined sequence pattern.

5. The device according to claim 4 wherein said series of communicating means includes a series of output coding means corresponding to said series of pluralities of actuator control means, respectively, a series of input coding means corresponding to said series of pluralities of sequence control means, respectively, means responsive to each output signal indication produced by the second means in each of said series of pluralities of actuator control means for comparing the output coding means of its associated series of actuator control means with each of said series of input coding means, and means responsive to each similar input and output coding means during the comparison performed by the last-named means for applying said input signal indication to the activated means in said series of pluralities of sequence control means associated with the similar input coding means.

6. In combination with a series of actuators, each of said actuators being responsive to an applied signal for undergoing and completing a predetermined actuation; first means for storing and recirculating a series of binary digits; programming means for dividing the series of digits recirculated by said first means into a series of digit groups corresponding to said series of actuators, respectively, and further dividing each of said sections digit groups into input and output binary number codes; a first series of input means corresponding to said series of digit groups, respectively, each of said input means being responsive to the receipt of a predetermined number of input signal indications for applying an actuating signal to its corresponding actuator; comparison means responsive to the completion of each ordered actuation by an actuator for comparing the output binary code of the digit groups associated with the actuator completing the ordered actuation with the input binary number code in each of said series of digit groups; and means responsive to each correspondence between the input and output code comparisons performed by said comparison means for applying an input signal indication to the input means of the digit group whose input code corresponds to the output code whereby each completion of actuation of the series of actuators is communicated to predetermined input means.

7. The combination according to claim 6 wherein said programming means includes, in addition, means for dividing each of said input and output codes in each of said series of digit groups into first and second parts, and the last-named means applies said input signal indication only if the first parts of said input and output binary codes have coincident binary number digits of one value, and the second parts of said input and output binary number codes are identical in value as based upon the comparison performed by said comparison means.

8. An electronic computer for ordering the actuation of a series of actuators according to any predetermined sequencing pattern, each of said series of actuators being reponsive to an applied signal for undergoing an actuation cycle, said computer comprising: first and second means for storing and serially recirculating a series of binary digits; programming means for dividing the recirculating digits each of said first and second means into a series of digit groups corresponding to said series of actuators, respectively, and further sub-dividing each of said series of digit groups into first and second binary numbers, the first binary numbers recirculated by said first and second means having normally an active and an inactive status, respectively, but responsive when ordered for going to an inactive and active status, respectively, the magnitudes of said first binary numbers, when in an active status corresponding to the number of consecutive actuation cycles to be made by its corresponding actuator; commutator means for serially communicating with said series of actuators; third means for electrically indicating each actuator communication made by said commutating means with the simultaneous recirculation of its corresponding digit group by said first means; fourth means reresponsive to each electrical indication produced by said third means and a first number in an active status in the indicated section for applying actuating signals to the actuator in communication with said commutating means; fifth means responsive to the completion of the number of actuations of each actuator corresponding to the magnitude of the first number in an active status in each of said series of digit groups for ordering said first number to an inactive status; sixth means responsive to the completion of the number of actuations of each actuator corresponding to the magnitude of the first number of each of said series of digit groups for modifying the second number of preselected digit groups in said series of digit groups recirculated by said first means whereby the completion of actuation of each actuator is communicated in a predetermined pattern to the series of digit groups recirculated by said first means; and seventh means responsive to a predetermined modification of each of the second binary numbers in said series of digit groups recirculated by said first means for simultaneously transferring the associated digit group recirculated by said second means into said first means and ordering the first number of the associated digit group from a normally inactive to an active status whereby said fourth means than initiates a predetermined number of actuations of its associated actuator based upon the first number ordered to an active status of each transferred digit group.

9. The electronic computer according to claim 8 wherein said programming means, in addition, divides each of said digit groups into a third binary number, the magnitude of the third binary number in each of the digit groups recirculated by said second means corresponding to the number of transfers to be made by said seventh means of its associated digit group into said first means, and eighth means responsive to each transfer made by said seventh means for modifying the value of the third binary number of the transferred digit group as recirculated by said second means.

10. The electronic computer according to claim 9 including, in addition, binary memory means for storing a plurality of digit groups corresponding to each digit group recirculated by said first and second means, each of said plurality of digit groups being programmed by said programming means, the first number in each of said plurality of digit groups being normally in an inactive status but responsive when ordered for going into an active status; and ninth means responsive to a predetermined modification of the third number in each of said digit groups recirculated by said second means as produced by said eighth means for transferring one of its corresponding plurality of digit groups from said binary memory means to said second means whereby a continuous sequenced program is ordered for said series of actuators.

11. The electronic computer according to claim 10 wherein said programming means, in addition, divides each of said digit groups into a fourth binary number, the fourth binary number in each digit group recirculated by said second means corresponding to a similar fourth number in one of the digit groups stored by said binary memory means, the digit group having said similar fourth number representing the next digit group of the associated plurality of digit groups stored by said binary memory means to be transferred into said second means by said ninth means, said ninth means including, in addition, means responsive to the fourth binary numbers in each digit group having said predetermined third binary number modification and a similar fourth number in the digit groups stored by said binary memory means for transferring the digit group having said similar fourth number to said second means.

12. The electronic computer according to claim 11 including, in addition, a series of input and output coding means for said series of digit groups, respectively, said sixth means including, in addition, comparison means responsive to the completion of the number of actuations corresponding to the magnitude of the first number in each of said series of digit groups for comparing the output coding means associated with said series of digit groups, respectively, with each of said series of input coding means, and modifying means responsive to a predetermined correspondence between each input and output coding means compared by said comparison means for modifying the second number in each digit group recirculated by said first means having the corresponding input coding means.

13. The electronic computer according to claim 12 wherein each of said series of input and output coding means are divided into first and second binary numbers, and said modifying means modifies the second number in each digit group recirculated by said first means if the first binary numbers of said compared input and output binary means have any coincident binary number digits of one value, and if the second binary numbers of said compared input and output coding means are identical in value.

14. The electronic computer according to claim 13 including, in addition, selectively actuable means responsive when actuated for modifying the first and second binary numbers in predetermined input and output coding means of said series of input and output coding means whereby the coding relationships between said series of digit groups may be altered by actuating said selectively actuable means.

15. The electronic computer according to claim 14 including, in addition, actuator means responsive when actuated for actuating said selectively actuable means, and means for coupling said actuator means to said commutator means whereby said actuator means is controlled by said electronic computer and hence said computer can order changes made in the coding relationship between its said series of digit groups.

16. In combination: multi-position actuator means including movable means responsive to first and second applied signals for moving in first and second directions, respectively, means responsive to the completion of predetermined amounts of movement in said first and second directions for stopping said first and second signals, respectively, whereby said movable means assumes a steady state position, and output means for producing alternate first and second output signals in response to alternate steady state positions of said movable means; actuator control means for controlling said multi-position actuator means, said actuator control means including first means for storing a number corresponding to a number of consecutive movements to be made by said actuator, second means for determining one of said first or second directions of movement to be made by said multiposition actuator, normally actuable means responsive to the direction of movement determined by said second means and the appearance of either of said first or second output signals produced by the output means of said multi-position actuator means for applying a first or second input signal corresponding to the direction determined by said first means to the driving means of said multi-position actuator means, third means responsive to each change of appearance between the first and second output signals produced by the output means of said multi-position actuator means for modifying the number stored by said first means, and means responsive to a predetermined value of the number stored by said first means as modified by said third means for rendering said normally actuable means inactive whereby the actuations of said multi-position actuator are halted after a predetermined number of movements have been made.

17. A general purpose sequencing computer for controlling the sequence of actuations of a series of actuators, each of said actuators having at least two normal states and responsive to an applied signal for changing from one to another of its normal states, said general purpose sequencing computer comprising: a series of control means corresponding to said series of actuators, respectively, each of said control means including counting means for counting applied input signals and responsive to a predetermined count in said counting means for producing an output signal commutating means for serially coupling said series of control means to said series of actuators, respectively, whereby each output signal produced by each of said control means is applied to its actuator during its associated coupling interval; and means responsive to each completion of change of state of each of said actuators for applying input signals to the counting means of predetermined control means of said series of control means whereby a sequence of actuations of said series of actuators is produced.

18. A general purpose sequencing computer for controlling the sequence of actuations of a series of actuators, each of said actuators being responsive to an applied signal for undergoing an actuation cycle, said general purpose sequencing computer comprising: a series of control means corresponding to said series of actuators, respectively, each of said control means including counting means for counting applied input signals and responsive to a predetermined count in said counting means for producing an output signal; means for serially coupling said series of control means to said series of actuators, respectively, whereby each output signal produced by each of said control means is applied to its actuator during its associated coupling interval; and a series of communicating means corresponding to said series of control means, respectively, and said series of actuators, respectively, each of said communicating means being responsive to the completion of an actuation cycle of its associated actuator for applying input signals to the counting means of predetermined control means in said series of control means whereby a predetermined sequence of actuations are performed by said series of actuators based on the counts in the counting means in each of said control means and the particular control means to which input signals are applied by each of said communicating means.

References Cited by the Examiner

UNITED STATES PATENTS

| | | | |
|---|---|---|---|
| 2,792,991 | 5/57 | Di Cambio | 235—157 |
| 2,811,709 | 10/57 | Haselton et al. | 340—174.1 |
| 2,838,963 | 6/58 | Good | 90—13.99 |
| 2,852,761 | 9/58 | Hagopian | 340—174.1 |
| 2,898,483 | 8/59 | Muller | 90—13.99 |
| 2,910,236 | 10/59 | Harper | 235—157 |
| 2,974,867 | 5/61 | Steele | 235—167 |
| 3,013,166 | 12/61 | Dunlap | 90—13.99 |

MALCOLM A. MORRISON, *Primary Examiner.*

LEO SMILOW, WALTER W. BURNS, Jr., *Examiners.*